(12) United States Patent
Herwanger

(10) Patent No.: US 7,859,943 B2
(45) Date of Patent: Dec. 28, 2010

(54) PROCESSING A SEISMIC MONITOR SURVEY

(75) Inventor: Jorg V. Herwanger, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 754 days.

(21) Appl. No.: 11/750,504

(22) Filed: May 18, 2007

(65) Prior Publication Data

US 2008/0033656 A1 Feb. 7, 2008

Related U.S. Application Data

(63) Continuation-in-part of application No. 11/180,956, filed on Jul. 13, 2005.

(51) Int. Cl.
G01V 1/00 (2006.01)

(52) U.S. Cl. ............... 367/38; 367/72; 367/73

(58) Field of Classification Search .......... 367/38, 367/72, 73, 28
See application file for complete search history.

(56) References Cited

U.S. PATENT DOCUMENTS

| 6,389,361 | B1 * | 5/2002 | Geiser | 702/15 |
| 6,714,873 | B2 | 3/2004 | Bakulin et al. | |
| 6,980,940 | B1 * | 12/2005 | Gurpinar et al. | 703/10 |
| 7,127,353 | B2 * | 10/2006 | Geiser | 702/13 |
| 2002/0013687 | A1 * | 1/2002 | Ortoleva | 703/10 |
| 2003/0125878 | A1 | 7/2003 | Bakulin et al. | |
| 2004/0199329 | A1 | 10/2004 | Stone | |

FOREIGN PATENT DOCUMENTS

| GB | 2 323 443 | 9/1998 |
| WO | WO 2005/040858 | 5/2005 |
| WO | WO 2006/003137 | 1/2006 |

OTHER PUBLICATIONS

Herwanger and Horne, "Predicting time-lapse stress effects in seismic data," *The Leading Edge*, 24(12):1234-1242, 2005.
Kenter et al., "Geomechanics and 4D: Evaluation of reservoir characteristics from time-shifts in the overburden," *ARMA/NARMS* 04-627, 2004.
Minkoff et al., "Coupled geomechanics and flow simulation for time-lapse seismic monitoring," *Geophysics*, 69(1):200-211, 2004.
Molenaar et al., "Applying geo-mechanics and 4D: 4D in-situ stress as a complementary tool for optimizing field management," *ARMA/NARMS* 04-639, 2004.
Olden et al., "Modeling combined fluid and stress change effects in the seismic response of a producing hydrocarbon reservoir," *The Leading Edge*, 20:1154-1163, Oct. 2001.

(Continued)

*Primary Examiner*—Mark Hellner

(57) ABSTRACT

A technique includes accessing seismic data that is associated with seismic measurements taken from a reservoir and a surrounding rock mass at a given time. Based on a velocity model developed from a predicted change in the reservoir and surrounding rock mass occurring from a prior to the given time, processing the seismic data to generate a survey of the reservoir and surrounding rock mass.

24 Claims, 24 Drawing Sheets

OTHER PUBLICATIONS

Olofsson et al., "Azimuthal anisotropy from the Valhall 4C 3D survey," *The Leading Edge*, 22(12):1228-1235, Dec. 2003.

U.S. Appl. No. 60/513,955, Kenter et al.

Prioul, Bakulin and Bakulin, "Non-linear rock physics model for estimation of 3-D subsurface stress in anisotropic formations: Theory and laboratory verification," *Geophysics*, 69(2):415-425, 2004.

UK Search Report dated Mar. 20, 2006 for Application GE 0600216.6.

Van Dok, Gaiser and Byerley, "Near-surface shear wave birefringence in the North Sea: Ekofisk 2D/4C test," *The Leading Edge*, 22(12):1236-1242, 2003.

Vidal, Huguet and Mechler, "Characterizing reservoir parameters by integrating seismic monitoring and geomechanics," *The Leading Edge*, 21(3):295-301, Mar. 2002.

Zatsepin and Crampin, "Modeling the compliance of crustal rock I. Response of shear wave splitting to differential stress," *Geophys. J. Int.*, 129(3):477-494, 1997.

\* cited by examiner

DISPLACEMENT IN VERTICAL PLANE
(CENTRAL PROFILE)

DISPLACEMENT IN HORIZONTAL PLANE
(CENTRAL PROFILE)

**DISPLACEMENT IN VERTICAL PLANE
(OFFSET PROFILE)**

**DISPLACEMENT IN HORIZONTAL PLANE
(OFFSET PROFILE)**

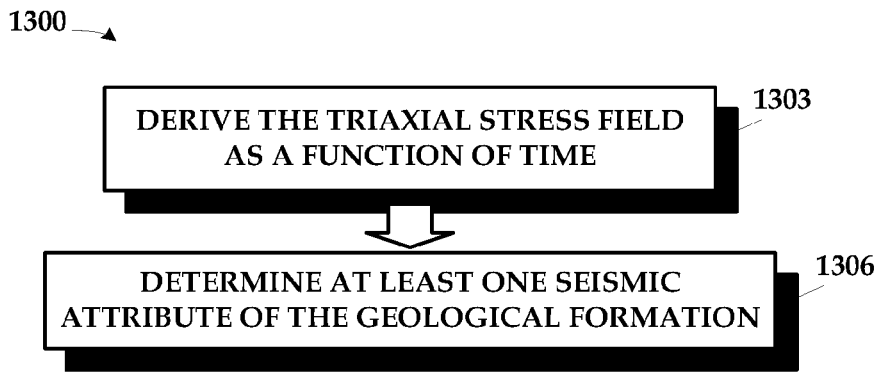
FIG. 13
FIG. 19
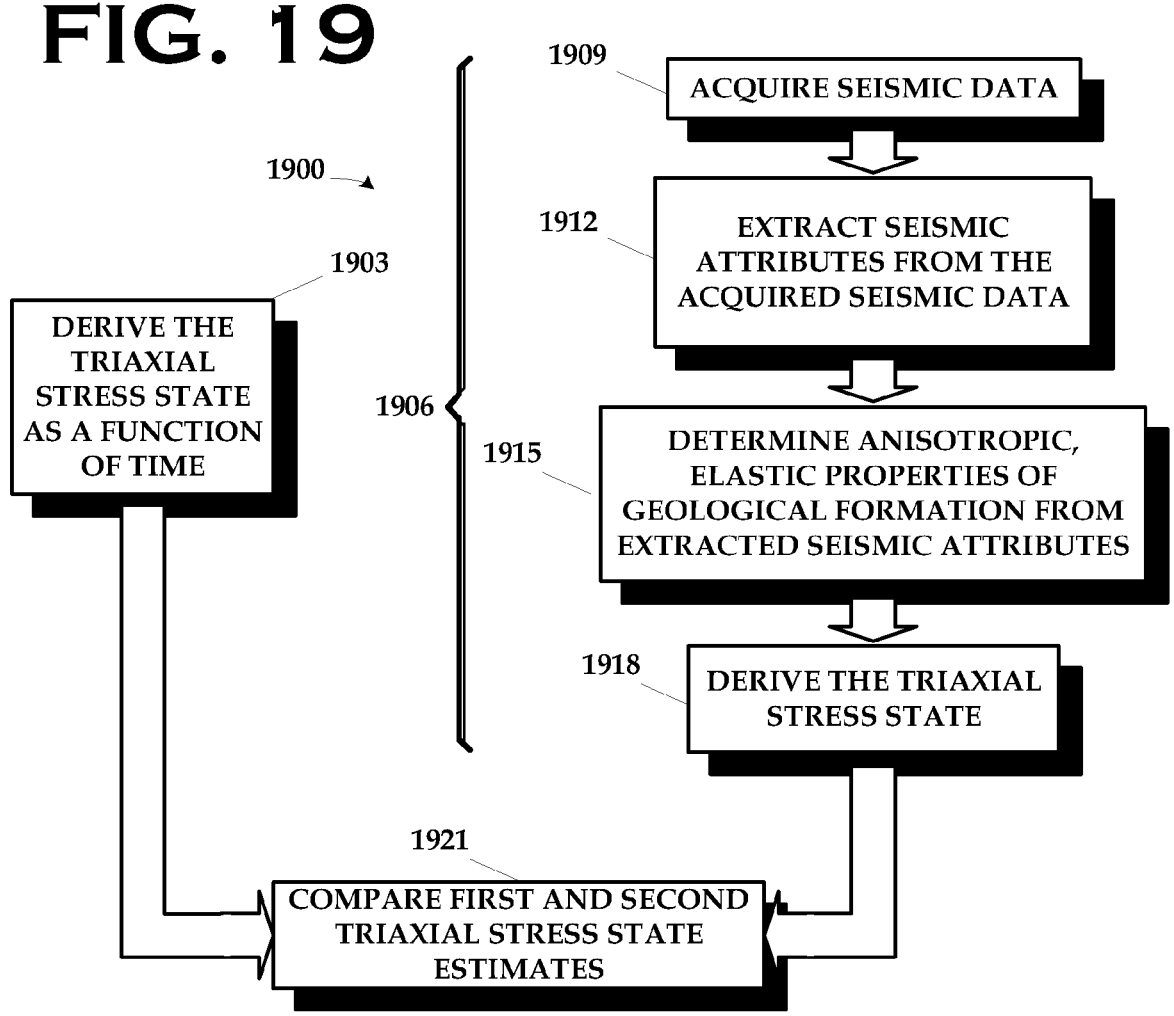

US 7,859,943 B2

PROCESSING A SEISMIC MONITOR SURVEY

This application is a continuation-in-part of U.S. patent application Ser. No. 11/180,956, entitled "DETERMINATION OF ANISOTROPIC PHYSICAL CHARACTERISTICS IN AND AROUND RESERVOIRS", filed on Jul. 13, 2005, which is commonly assigned herewith and is incorporated by reference in its entirety.

BACKGROUND

The invention generally relates to processing a seismic monitor survey.

Much effort is expended in locating, evaluating, and exploiting hydrocarbon deposits, e.g., oil and natural gas, trapped in subterranean geological formations. It is highly desirable to locate hydrocarbon deposits in reservoirs. For present purposes, a "reservoir" shall be considered to be any geological medium containing voids (e.g., pores or fractures) in the subsurface from which liquid or gas can be extracted or into which liquid or gas can be injected. However, such reservoirs can be exploited in a number of ways other than extracting hydrocarbons. For instance, such reservoirs can also be used to temporarily store hydrocarbons previously produced or for carbon dioxide ("$CO_2$") sequestration. Once located, a reservoir may be evaluated for potential production or other exploitation. A likely prospect can then be exploited by, for instance, drilling a well through which or into which a gas or a liquid can be extracted or injected.

Seismic exploration involves surveying subterranean geological formations for hydrocarbon deposits. A survey typically involves deploying seismic source(s) and seismic sensors at predetermined locations. The sources generate seismic waves which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (geophones), and industrial surveys may deploy only one type of sensors or both. In response to the detected waves, the sensors generate electrical signals to produce seismic data. Analysis of the seismic data can then indicate the presence or absence of probable locations of hydrocarbon deposits.

An important step in obtaining a subsurface image from seismic data is a process called migration. One key prerequisite for this process is the availability of a suitable velocity model. Traditionally, the velocity model is derived from manual or automatic picking of seismic arrival times and suitable processing. This process may be time-consuming and therefore expensive.

In time lapse siesmics, the goal is to derive two or more sets of seismic energies and seismic attributes, which contain information about reservoir properties, such as fluid saturations, stress, pressure or temperature. The first seismic survey is called a base survey, and subsequent surveys are called monitor surveys. Migration of the monitor surveys requires a velocity model. Using conventional techniques, the velocity model that is derived from the base survey is also used for migration of the monitor surveys. Such an approach avoids the time-consuming process of velocity picking and analysis. However, the conventional approach may lead to sub-optimal migration images and may introduce errors in migration amplitudes due to mis-stacking caused by a sub-optimal velocity model.

SUMMARY OF THE INVENTION

In an embodiment of the invention, a technique includes accessing seismic data that is associated with seismic measurements taken from a reservoir and a surrounding rock mass at a given time. Based on a velocity model developed from a predicted change in the reservoir and surrounding rock mass occurring from a prior to the given time, processing the seismic data to generate a survey of the reservoir and surrounding rock mass.

In an another embodiment of the invention, an article includes a computer accessible storage medium that stores instructions that when executed cause a processor-based system to receive seismic data that is associated with the seismic measurements taken from a reservoir and a surrounding rock mass at a given time. The instructions when executed cause the processor-based system to based on a velocity model that is developed from a predicted changed in the reservoir and surrounding rock mass occurring from a time prior to the given time to the given time, process the seismic data to generate a survey of the reservoir and the surrounding rock mass.

In yet another embodiment of the invention, a system includes an interface and a processor. The interface receives seismic data that is associated with seismic measurements that are taken from a reservoir and a surrounding rock mass at a given time. The processor based on a velocity model that is developed from a predicted change in the reservoir and surrounding rock mass occurring from a time prior to the given time to the given time, processes the seismic data to generate a survey of the reservoir and the surrounding rock mass.

Advantages and other features of the invention will become apparent from the following drawing, description and claims.

BRIEF DESCRIPTION OF THE DRAWING

FIG. 13 illustrates one particular embodiment of a method in accordance with the present invention wherein the present invention is used to estimate the perturbations in stress over time and estimate its affect on seismic attributes of interest;

FIG. 19 illustrates one particular embodiment of a method in accordance with the present invention wherein the present invention alternative to that shown in FIG. 13;

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
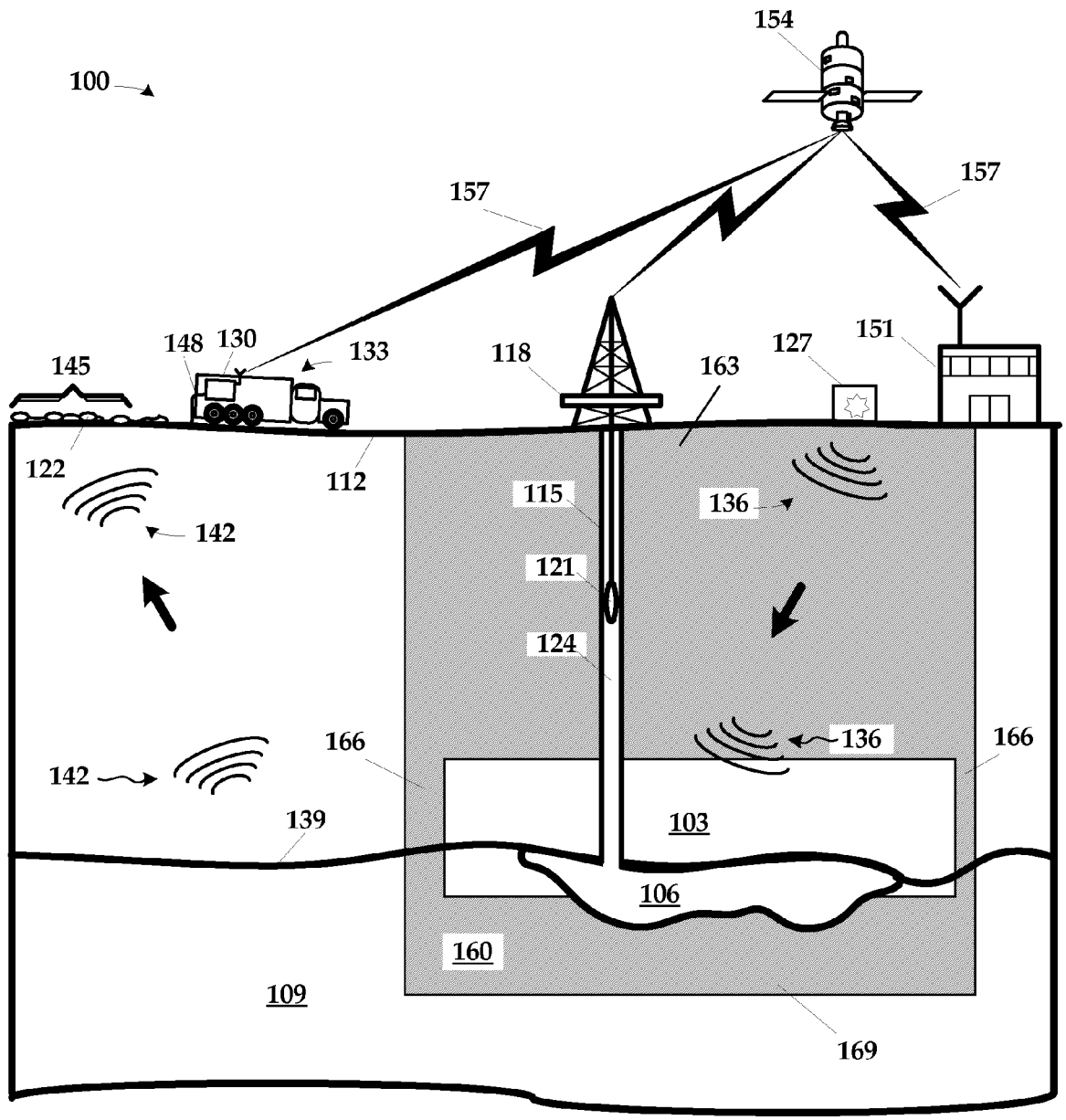
FIG. 1 depicts a stress field above a reservoir of interest in a subterranean geological formation and the acquisition of geophysical data regarding the same.

FIG. 1 depicts a representative scenario 100 in which a reservoir 106 of interest is embedded in a geological formation 109 beneath the ground surface 112. A stress field 103 is schematically indicated. The stress field 103 is shown as a geometric shape with sharply, clearly defined edges. As those in the art having the benefit of this disclosure will appreciate, this is a convenience used for purposes of illustration. Furthermore, in nature, a stress field will present in the entire geological formation 109. The scenario 100 is a land-based scenario although the invention is not so limited. The present invention may alternatively be employed, for instance, in a marine environment or in a transitional zone between land and marine environments.

Figure 2:
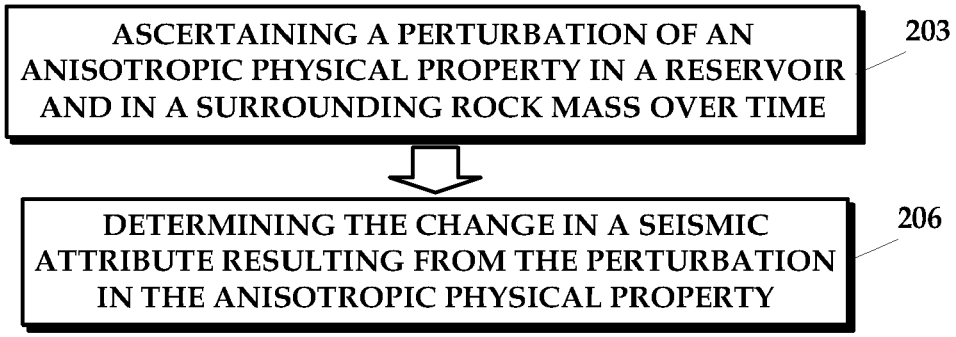
FIG. 2 illustrates a method practiced in accordance with the present invention for extracting seismic attributes of the geological formation of FIG. 1, for example, through the stress field shown therein.

FIG. 2 illustrates a method 200 practiced in accordance with the present invention for extracting seismic attributes indicative of a stress field 103 in a geological formation 109. The method 200 begins by ascertaining (at 203) the perturbation of an anisotropic physical property (e.g., the change in anisotropic stress state) in a geological formation, e.g., the geological formation 109, above or in a reservoir, e.g., the reservoir 106, and in a surrounding rock mass, e.g., the surrounding rock mass 160, over time. The anisotropic physical property could be, for instance, a perturbation in at least one of a multi-dimensional stress state, changes in fluid content, changes in fluid saturation, pore pressure, temperature and dislocation of reflectors. The method 200 then determines (at 206) the change in a seismic attribute resulting from the perturbations of the anisotropic physical property. These estimated changes in seismic velocity may then, in various alternative embodiments, be compared with observed changes in seismic attributes.

Figure 3:
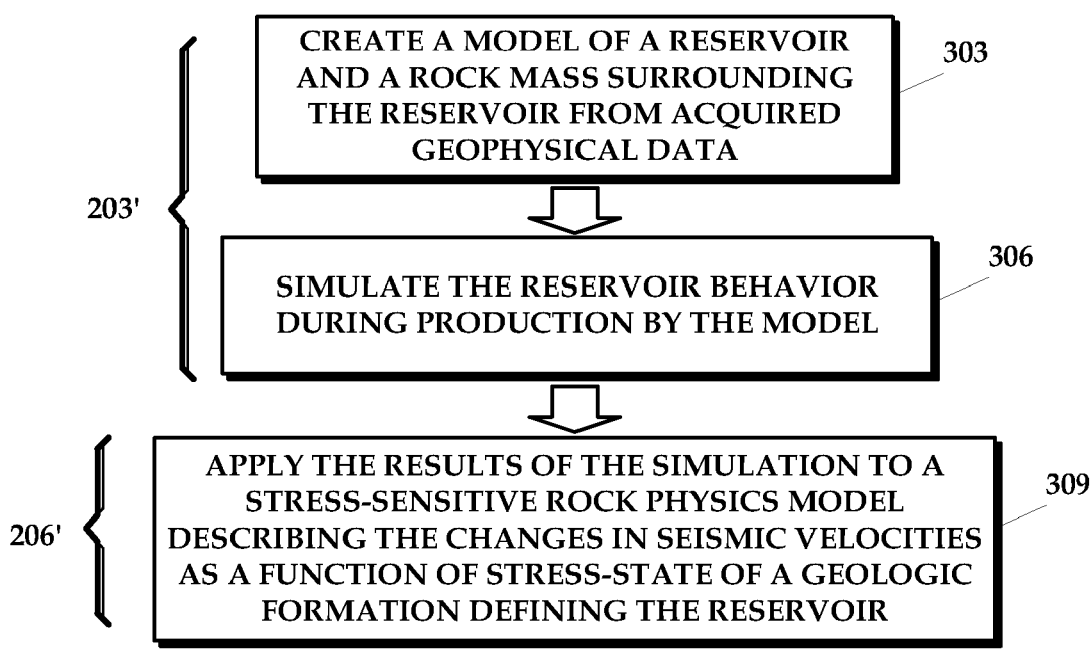
FIG. 3 illustrates a method in accordance with one particular embodiment of the method of FIG. 2.

The invention admits wide variation in how the method 200, shown in FIG. 2, may be implemented. To further an understanding of the present invention, one particular embodiment will now be presented in greater detail. FIG. 3 illustrates a method 300 in accordance with the particular embodiment mentioned immediately above. Note that, in the method 300, the anisotropic physical property is a multi-dimensional (and, more specifically, a triaxial) stress state. However, to make the method represent the actual physical processes in the subsurface, in alternative embodiments, other physical properties such as the changes in fluid content, changes in fluid saturation, and dislocation of reflectors, etc. may be examined in addition to the stress state.

The method 300 will be disclosed in the context of the reservoir 106 shown in FIG. 1, although it may be applied to other reservoirs. This particular embodiment considers the triaxial nature of stress-fields and changes in stress-field during production, and utilizes the anisotropic nature of subsurface velocity distribution. This approach models more closely:

(i) the physical processes of fluid flow through porous media that occur during reservoir production (modeled by a reservoir simulator);

(ii) subsurface deformation, stress and strain (modeled by a geomechanical simulator); and (iii) seismic waves propagating through the subsurface, than do conventional techniques.

Additionally this particular embodiment uses shear wave ("s-wave") data as well as compressional wave ("p-wave") data using multi-component acquisition technology, which can have significant benefits over the use of p-wave data alone.

The method 300 ascertains (at 203') the perturbation of stress in a geological formation by creating (at 303) a model of the reservoir 106 and a rock mass surrounding the reservoir 106, shown in FIG. 1, from acquired geophysical data and simulating (at 306 the reservoir behavior during production by the model. The simulation (at 306) over time may, in some embodiments, simulate the effects of production on the reservoir 106 over time. To perform this act, the present invention employs a computing apparatus 400, shown in FIG. 4A-FIG. 4B, on which resides a coupled reservoir model/geomechanical model 403. The coupled reservoir model/geomechanical model 403 is a software construct comprising a software-implemented reservoir model 406, a software-implemented geomechanical model 409, and a software simulator 412 to predict the physical changes over time to these models 406, 409. The reservoir model 406 and the geomechanical model 409 are coupled in the sense that the changes in the geomechanical model 409 are influenced by changes in the reservoir model 406 and vice versa.

The reservoir model 406 and geomechanical model 409 can be used to determine the deformation, stress and strain in the subsurface by modeling, i.e., the geological formation 109, due to, in this particular embodiment, reservoir production. This involves modeling in software the reservoir 106 and the rock-mass surrounding the reservoir, especially that part of the rock mass 160 including the stress field 103. Techniques for this type of modeling are known to the art, and any such technique that is suitable may be used. Note that these types of models known to the art assume the reservoir is isotropic.

In general, the reservoir model 406 and the geomechanical model 409 should capture useful data such as the size of the reservoir 106, the location and number of wells 115 penetrating the reservoir 106, physical properties of the reservoir 106 (e.g., fluid properties, porosity and permeability of the material making up the reservoir 106, reservoir pore-pressure, etc.), and the initial stress state of the reservoir 106. Mechanical properties of the material making up the reservoir 106 and the surrounding rock mass should also be specified. These properties can be specified by Young's modulus and Poisson's ratio for elastically deforming media, as is known in the art. The mechanical properties can also include material properties for non-elastic deformation in some embodiments. If desired anisotropic descriptions for Young's modulus and Poisson's ratio can also be used.

The data can be acquired specifically for purposes of building the reservoir model 406 and geomechanical model 409 or may be retrieved from previously acquired and archived data. FIG. 1 conceptually depicts some common data acquisition techniques that might be employed in this context. For instance, the well 115 includes a rig 118 from which a tool 121 is suspended into the well bore 124. The tool 121 could be, for example, a wireline logging tool or a coring tool with which logging data or core data can be obtained in accordance with conventional practice. FIG. 1 also shows a land-based, three-dimensional seismic survey, or "3D survey," which consequently yields 3D seismic data, although this is not necessary to the practice of the invention.

More particularly, the seismic survey employs an orthogonal shot and receiver survey design with wide azimuth and offset distribution. FIG. 1 shows a seismic source 127 and a data collection unit 130 centrally located on the recording truck 133. The seismic source 127 generates a plurality of seismic survey signals 136 in accordance with conventional practice. The seismic survey signals 136 propagate and are reflected by a reflector 139 within the geological formation 109. The seismic receivers 122 (only one indicated) receive the reflected signals 142 off the reflector 139 in a conventional manner. The seismic receivers 122 then generate data representative of the reflections 142, and the seismic data is embedded in electromagnetic signals. Data collected by the receivers 122 is transmitted over the communications link 148 to a data collection unit 130 in the illustrated embodiment. Note that, in some alternative embodiments, the recording array 145 may transmit data collected by the receivers 122 over a wired connection. The data collection unit 130 then collects the seismic data for processing.

The data collected aboard the recording truck 133 and/or the rig 118 may be processed locally, may be stored locally for processing at a later time, may be transmitted to a remote location for processing, or some combination of these things.

In the illustrated embodiment, the seismic data is transmitted to a fixed-base facility 151 via a satellite 154 and the satellite links 157, although this is not necessary to the practice of the invention. Ultimately, in the illustrated embodiment, the data collected by the seismic receivers 122 is transmitted to a central facility or location. This central facility may be a computing and storing center ("CSC"), e.g., the recording truck 133 or the fixed-base facility 151.

The geophysical data collected as described above is then used to build the reservoir model 406 and the geomechanical model 409. As was mentioned above, the geomechanical model 409 describes the reservoir 106 and the "surrounding rock mass" 160. What constitutes the surrounding rock mass 160 to be modeled in any given embodiment will be implementation specific. This is largely because each reservoir 106 and, more generally, each geological formation 109 will be unique even though broad similarities may be encountered. Other factors may also influence the determination, such as the end use to which the method 300 is being put.

The illustrated embodiment seeks knowledge of the behavior of the reservoir 106 during production. One important product of stress in the geological formation 109 during production is the subsidence of the earth surface 112 caused by the depletion of the reservoir 106. Deformation usually occurs more strongly vertically than it does laterally and more strongly above the reservoir 106 than below. Thus, the illustrated embodiment models the whole overburden 163 to the Earth's surface 112 (or the sea bottom, if used in marine applications). Underneath the reservoir 106, the illustrated embodiment models some "underburden" 169 and, towards the sides, some "sideburden" 166.

As a practical matter, the geomechanical model 409 terminates somewhere to the sides and the bottom. Where to terminate the modeling domain is a matter of judgment. One tries to get the border of the modeling domain far enough out, so that boundary effects do not influence the solution in the region of interest, e.g., the reservoir 106 and the overburden 163. At the same time one wants to keep the modeling domain small, in order to keep computational cost down. The resolution of these competing considerations is a matter of judgment well within the abilities of one ordinarily skilled in the art having the benefit of this disclosure and will vary by implementation.

After the reservoir model 406 and the geomechanical model 409 have been built, they are input to a simulation tool, e.g., the simulator 412. The simulator 412 simulates selected physical processes of the geological formation 109 as a function of time and, in the illustrated embodiment, during production. This simulator 412 can then produce reports of the subsurface deformation, the stress state, and other physical parameters, if requested, at pre-determined times of the production scenario.

In the illustrated embodiment, the simulator 412 is implemented using a commercially available software package marketed as ECLIPSE GEOMECHANICS by Schlumberger Technologies Corporation. The technique employed by this software package is disclosed in a United States Patent Application entitled, "Simulation Method and Apparatus for Determining Subsidence in a Reservoir", filed in the name of the inventor Terry Wayne Stone, assigned on its face to Schlumberger Technology Corporation, and published Oct. 7, 2004, as Publication No. 2004/0199329 A1. However, any similar software with comparable functionality known to the art may be used. The ECLIPSEGM software package comprises reservoir simulation software (also separately licensed as ECLIPSE) and an optional coupling of flow equations with stress and strain calculations called GEOMECHANICS. The geomechanics output includes a strain tensor, a stress tensor, a pore pressure, and deformation vectors for each element or cell (not shown) of the geological formation 109. Furthermore, these outputs can be produced at every report step of the simulation.

Figure 4A:
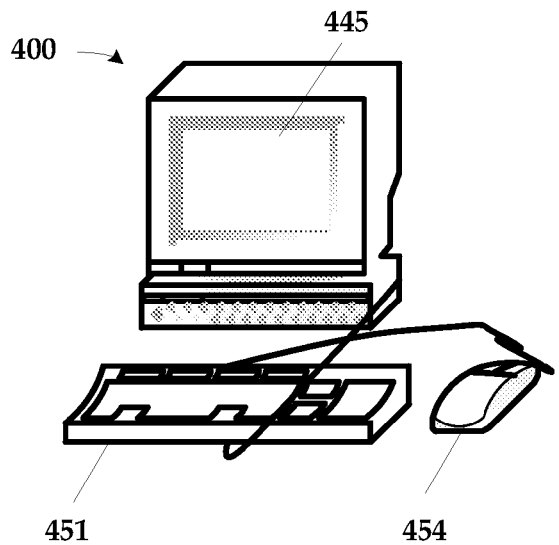
FIGS. 4A and 4B conceptually illustrate a data collection unit as may be used in the embodiment of FIG. 1.
Figure 4B:
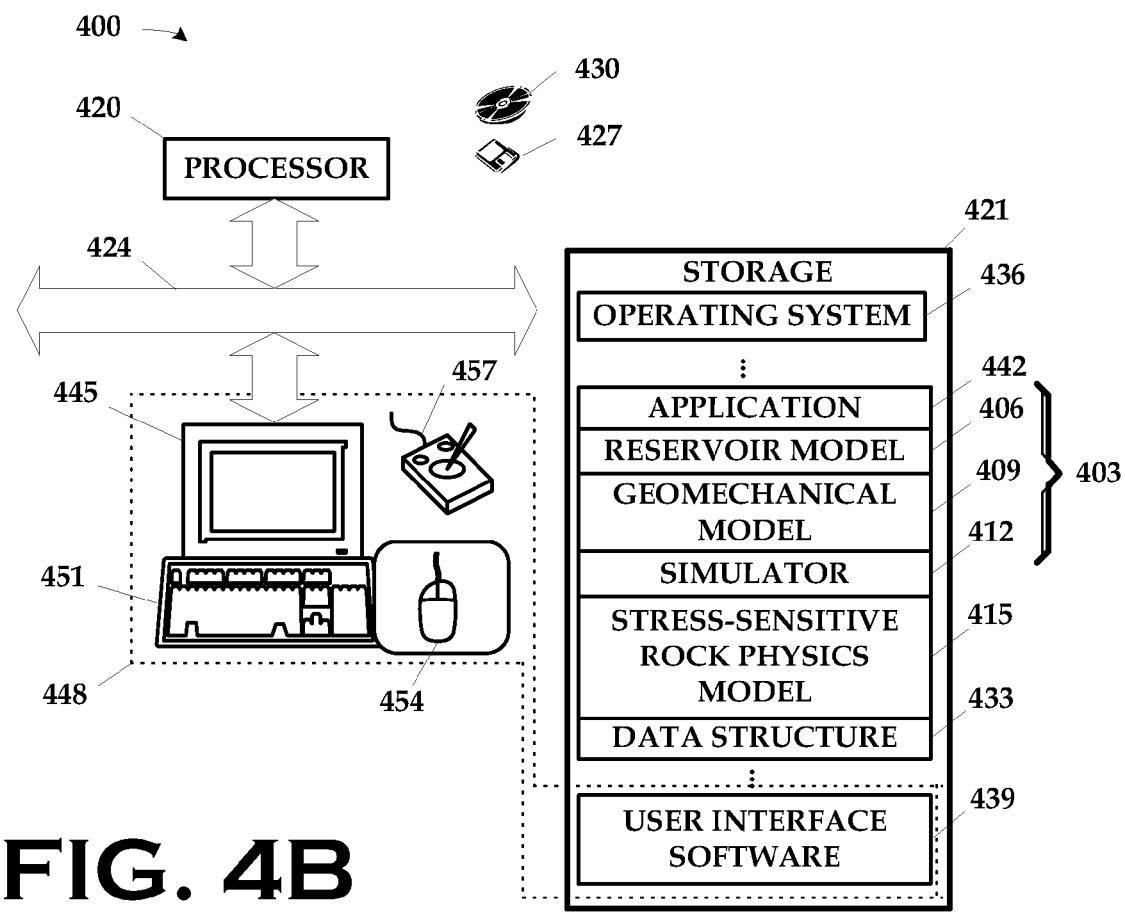

Returning to FIG. 3, the results of the simulation (at 306) by the simulator 412 are then applied (at 309) to a stress-sensitive rock physics model 415, shown in FIG. 4B. The stress-sensitive rock physics model 415 describes the changes in seismic velocities for the acoustic signals 136 and 142 as a function of stress-state of a geologic formation 109 containing the reservoir 106. Studies have shown that elastic properties, and therefore seismic velocities, for instance, are stress dependent.

Several techniques for determining and describing the stress state of the geological formation 109 are known to the art. For example:
(i) U.S. Pat. No. 6,714,873, entitled "System and method for estimating subsurface principal stresses from seismic reflection data," issued Mar. 30, 2004, to Schlumberger Technology Corporation as assignee of the inventors Andrey Bakulin et al. (the '873 patent); and
(ii) Prioul, R., Bakulin, A., and Bakulin, V., 2004, Non-linear rock physics model for estimation of 3-D subsurface stress in anisotropic formations: Theory and laboratory verification, *Geophysics*, 69(2), 415-425, have shown that the tri-axial stress state can be extracted from multi-component PP and PS seismic data by extracting anisotropic velocity parameters from azimuthal and offset observations. Furthermore, the aforementioned patent application filed in the name of Stone describes a method to calculate the changes of the triaxial stress-field due to reservoir production. Still other techniques are known to the art and may be employed in conjunction with the present invention.

More particularly, stress-sensitive rock physics model 415 describes the changes in seismic velocities as a function of the triaxial stress-state of the geological formation 109. The art recognizes that the propagation speed of seismic waves through a rock-sample is influenced by the effective stress ("$\sigma_{eff}$") acting on the sample. In this circumstance, the effective stress $\sigma_{eff}$ is defined as:

$$\sigma_{eff} = \sigma_c - \alpha P$$

wherein,
$\sigma_c$=confining stress,
P=pore pressure, and
$\alpha$=Biot coefficient.

Note that if the stress-state is non-hydrostatic (i.e., tri-axial), anisotropic seismic properties result from an initially seismically isotropic rock-mass.

A number of models proposed in the literature allow predictions of anisotropic seismic velocities for a triaxial stress state. A good introduction and summary of available methods is given in Chapter 2.4 of Mavko, G., Mukerji, T., and Dvorkin, J., 1998, *The Rock Physics Handbook. Tools for Seismic Analysis in Porous Media*, Cambridge University Press (1998). These models describe the changes of anisotropic elastic properties of rocks under stress in terms of deformations of the compliant pore-space under stress. One model not mentioned in this text book is the Anisotropic Poro-Elasticity ("APE") model by Zatsepin, S. V., and Crampin, S., 1997, "Modeling the Compliance of Crustal Rock—I. Response of Shear-Wave Splitting to Differential Stress," *Geophys. J. Int.*, 129, 477-494 (1997). This model again calculates anisotropic elastic properties due to closing of compliant fracture or pore-space due to changes in effective stress. In its formulation, the model uses pore-pressure and confining stress separately. This approach could have advantages when coupled reservoir and stress simulation is performed (providing pore-pressure and confining stress) and the effect of these changes on anisotropic seismic velocities is studied.

For the present invention, the illustrated embodiments relate the whole stiffness tensor to the whole stress tensor. The whole stiffness tensor conveniently represents anisotropic seismic velocities, and other representations may be used in alternative embodiments. One practical method for implementing this relation is given in Prioul, R., Bakulin, A., and Bakulin, V., "Non-linear Rock Physics Model for Estimation of 3-D Subsurface Stress in Anisotropic Formations: Theory and Laboratory Verification," *Geophysics*, 69(2), 415-425 (2004):

$$c_{11} \cong c_{11}^0 + c_{111}E_{11} + c_{112}(E_{22}+E_{33}),$$

$$c_{22} \cong c_{11}^0 + c_{111}E_{22} + c_{112}(E_{11}+E_{33}),$$

$$c_{33} \cong c_{33}^0 + c_{111}E_{33} + c_{112}(E_{11}+E_{22}),$$

$$c_{12} \cong c_{12}^0 + c_{112}(E_{11}+E_{22}) + c_{123}E_{33},$$

$$c_{13} \cong c_{13}^0 + c_{112}(E_{11}+E_{33}) + c_{123}E_{22},$$

$$c_{23} \cong c_{13}^0 + c_{112}(E_{22}+E_{33}) + c_{123}E_{11},$$

$$c_{66} \cong c_{66}^0 + c_{144}E_{33} + c_{155}(E_{11}+E_{22}),$$

$$c_{55} \cong c_{55}^0 + c_{144}E_{22} + c_{155}(E_{22}+E_{33}),$$

$$c_{44} \cong c_{44}^0 + c_{144}E_{11} + c_{155}(E_{22}+E_{33}),$$

with $c_{144}=(c_{112}-c_{123})/2$, and $c_{155}=(c_{111}-c_{112})/4$

The stiffness coefficients $c_{ij}$ are a convenient notation to describe the anisotropic elastic behavior of a solid. For use in seismology, velocities and polarizations at arbitrary propagation directions can be calculated from the stiffness tensor $c_{ij}$.

Here, the $c_{ij}$ are the elements of the elastic stiffness tensor of a stressed medium in Voigt notation. They are calculated from the elastic constants $c_{ij}^0$ of the medium in an unstressed state (or, "reference" stress state). The perturbations caused by stress are calculated from the triaxial stress state (here given by the resulting strains $E_{11}$, $E_{22}$, and $E_{33}$, which can be converted to stresses by Hooke's law) and the coupling coefficients $c_{111}$, $c_{112}$ and $c_{123}$. The coupling coefficients can be determined from laboratory measurements or from in-situ measurements in boreholes. For a complete description of the method see Prioul, Bakulin and Bakulin (2004) and the '873 patent, both cited above. These references are hereby incorporated by reference for all purpose as if set forth verbatim herein.

As was mentioned above, the illustrated embodiment is performed on a computing apparatus 400, illustrated in FIG. 4A and FIG. 4B. The computing apparatus 400 includes a processor 420 communicating with storage 421 over a bus system 424. The storage 421 may include a hard disk and/or random access memory ("RAM") and/or removable storage such as a floppy magnetic disk 427 and an optical disk 430. The storage 421 is encoded with a data structure 433 storing the data set acquired as discussed above, an operating system 436, user interface software 439, and an application 442. The user interface software 439, in conjunction with a display 445, implements a user interface 448. The user interface 448 may include peripheral I/O devices such as a keypad or keyboard 451, a mouse 454, or a joystick 457. The processor 420 runs under the control of the operating system 436, which may be practically any operating system known to the art. The application 442 is invoked by the operating system 436 upon request, power up, reset, or both, depending on the implementation of the operating system 436.

The geophysical data acquired as discussed above relative to FIG. 1 is, in the illustrated embodiment, stored in the data structure 433, shown in FIG. 4B. Note that most embodiments will typically store the geophysical data in several data structures 433. The data structure(s) 433 may be any suitable type of data structures known to the art. Exemplary data structures include, but are not limited to, data bases, linked lists, tables, etc. Note that, because the geophysical data is stored in this embodiment, some or all of it may be archived for some time prior to being processed by the method 200 of FIG. 2. For instance, geophysical data relative to the geological formation 109 and particularly to the reservoir 106 may be specifically acquired. The specifically acquired geophysical data may be combined with archived data previously acquired (e.g., a year or more previously) to provide a set of time-lapse geophysical data.

Thus, in various aspects, the invention includes not only the method 200, shown in FIG. 2, but also various apparatus and other articles of manufacture. For instance, in one aspect, the invention includes a program storage medium, such as the magnetic disk 427 or the optical disk 430 in FIG. 4B, encoded with instructions that, when executed by a computing device, such as the processor 420, perform the method 200. The invention furthermore includes in yet another aspect a computing apparatus, such as the computing apparatus 400, programmed to perform such a method.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Returning now to FIG. 2, the method 200, particularly as embodied in the method 300, shown in FIG. 3, provides a reliable description of changes in the (triaxial or non-hydrostatic) stress-field in the Earth inside and surrounding a subsurface reservoirs during production. Consequently, it allows the prediction of the stress-state in the geological formation 109 as a function of time. This stress-state can then be used for a number of purposes. For instance, the method 200 may be employed to measure and extract seismic attributes from seismic data or to calculate seismic attributes from a know Earth elastic model. Seismic attributes include, for example, quantities such as travel times, changes in travel times, AVO-response, AVAz-response, NMO-response (also as function of azimuth), $v_p/v_s$ ratio and similar quantities.

Figure 5B:
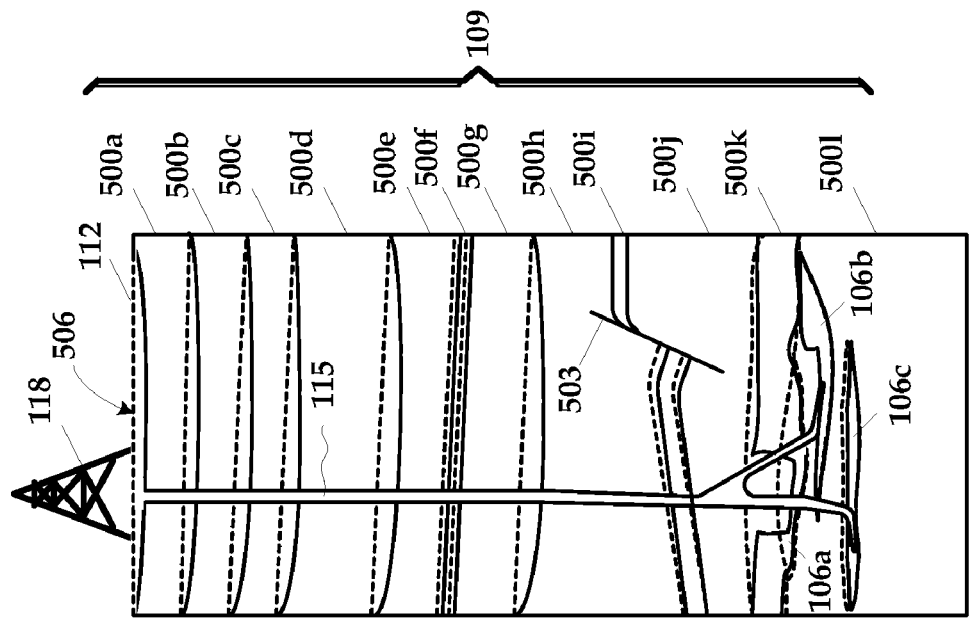
FIG. 5A-FIG. 5B illustrate the effects of producing the reservoir in FIG. 1 on the surface and the subterranean geological formation shown therein.
Figure 5A:
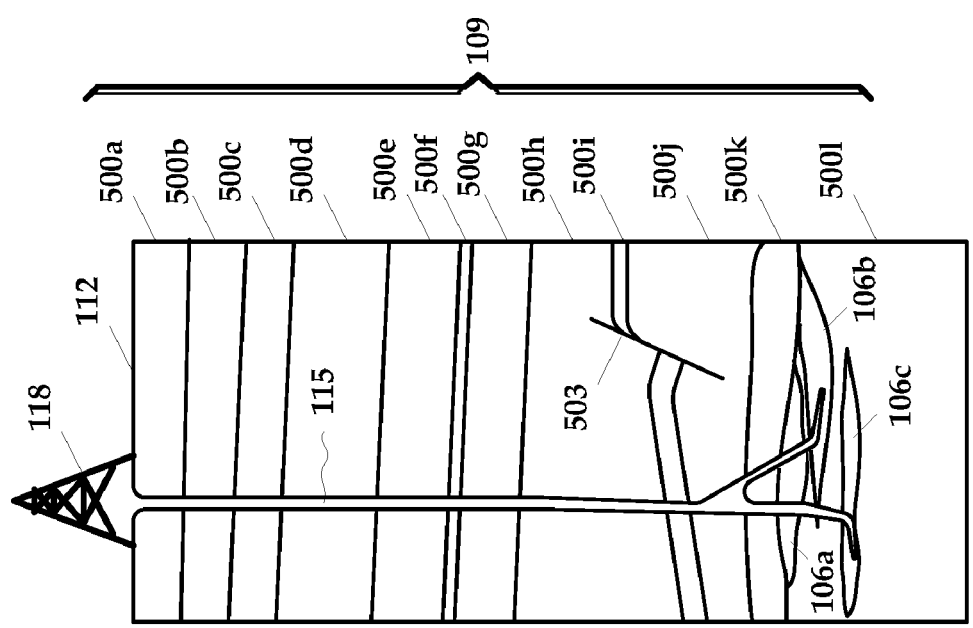

To more clearly illustrate the use of the present invention, one particular application in which the method 200, shown in FIG. 2, as manifested in the method 300, shown in FIG. 3, will now be discussed. In this particular embodiment, the invention is used to predict seismic attributes of the geological formation 109 first shown in FIG. 1. FIG. 5A-FIG. 5B illustrate the effects of producing the reservoir in FIG. 1 on the surface 112 and the subterranean geological formation shown therein.

More particularly, FIG. 5A illustrates a geological formation 109' with the well 115' producing from the reservoir 106'. The reservoir 106' comprises three portions 106a-106c. In this illustration, the geological formation 109' comprises a number of layers 500a-500l. The reservoir 106' resides in the layer 500l, sealed by the layer 500k. Note that the layer 500i includes a fault 503. The layers 500a-500l have different compositions and characteristics. For instance, the layers 500a-500c comprise unconsolidated sediments; the layers 500e-500g a soft layer; the layer 500k a caprock, and the layer 500l porous reservoir rock.

FIG. 5B illustrates the effect of the production over time, resulting in compaction (i.e., shrinking of the reservoir 106a-106c) and deformation of the layers 500a-500k, exacerbating the fault 503, and generating subsidence at the surface 112'. Note that the subsidence is evidenced by the depression 506 in the surface 112'. The original boundaries of the layers 500a-500l in FIG. 5A are shown in ghosted lines in FIG. 5B for reference.

Figure 6:
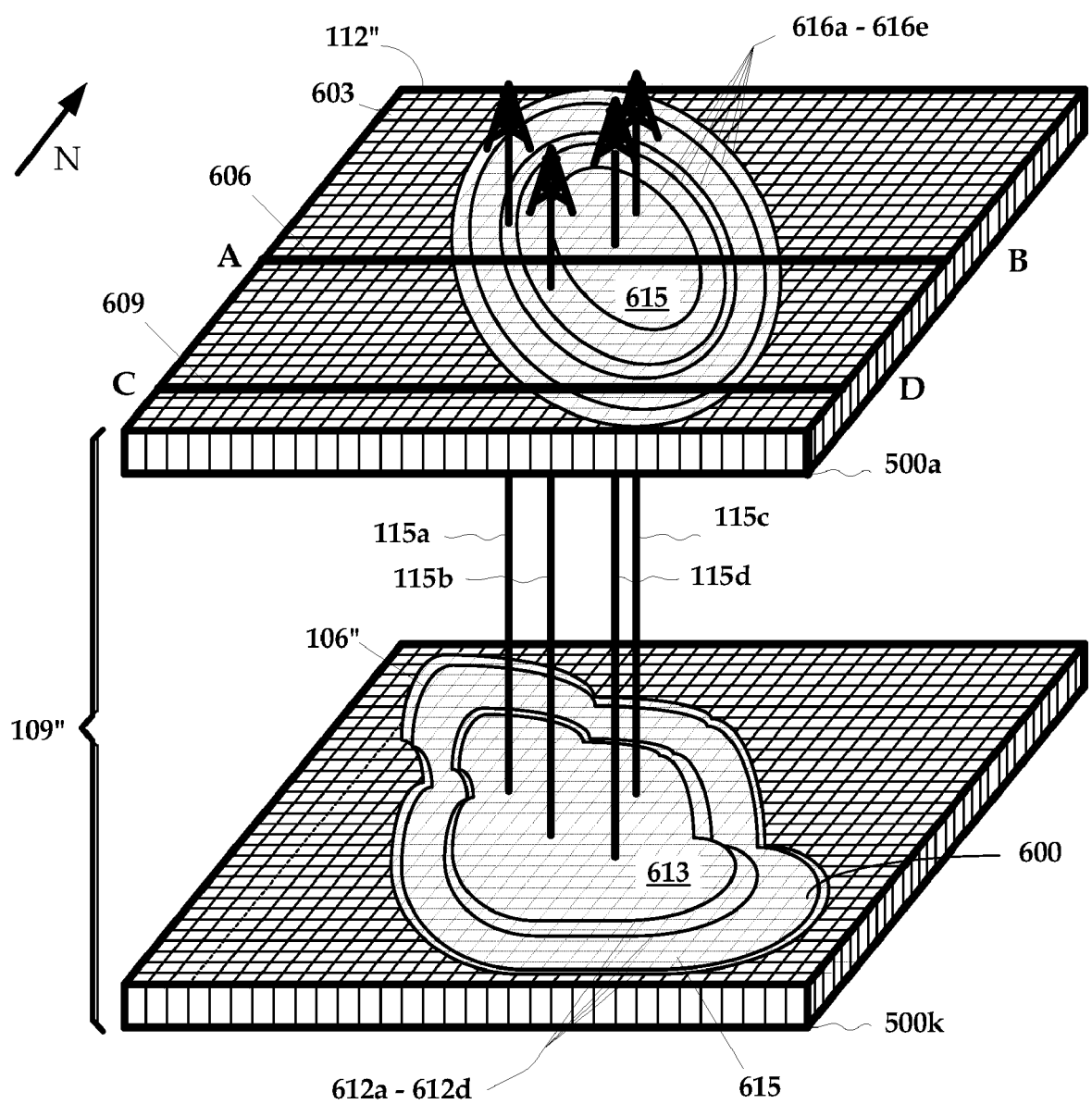
FIG. 6 shows portions of a modeled geological formation in a three-dimensional, perspective view.

However, as those in the art having the benefit of this disclosure will be aware, the reservoir 106' will typically be exploited by multiple wells and that the effects of the production will not be uniform in all directions. FIG. 6 therefore shows portions of the modeled geological formation 109" in a three-dimensional, perspective view. In this view, the simulated reservoir 106" is shown at the overburden interface 600, i.e., where the layer 500k, shown in FIG. 5A-FIG. 5B, seals the modeled reservoir 106". This study uses published data to construct a generic North Sea chalk field with physical properties being representative of those encountered in real North Sea oilfields. A sketch containing representation of the reservoir layer and the near surface layer is given in FIG. 6. The modeled reservoir 106" is a double-dipping anticline approximately 8 km long and 4 km wide. The strike of the long axis is NW-SE. The chalk making up the reservoir 106' is porous with porosities of up to 50%. However, permeability is relatively small due to the small size of pores. Typical values are 1-5 mD, but due to fracturing can values up to 100 mD can result.

FIG. 6 shows only the layers 500a and the reservoir layer 106, with four representative wells 115a-115d, penetrating the modeled reservoir 106" through the modeled geological formation 109". Each well 115a-115d is assigned 25% of total annual production from the modeled reservoir 106" for purposes of illustration. Each of the layers 500a, 500j is shown in a stylized fashion with a plurality of cells 603, only one indicated, representing the discretization of the geophysical data acquired therefrom in accordance with conventional practice.

The rings 612a-612d represent contours of vertical displacement in a deformation field 613 after three years of simulated production caused by the compaction of the reservoir 106". Compaction of the reservoir 106" results in surface subsidence shown by a subsidence bowl 615. Although not shown, the compaction has affected the intervening layers between the layers 500a, 500k. The subsidence bowl is represented by a plurality of contours 616a-616e. The subsidence bowl 615 is smooth, with a maximum vertical displacement of 30 cm over the centre of the field. In the reservoir 106", maximum vertical displacement of almost 50 cm in the deformation field 613 is observed. The displacement in the reservoir 106" is strongest near the wells 115a-115d and the deformation field 613 is not nearly as smooth as the near-surface displacement field. This information implies that the near-surface stress field will be smooth and the stress field at the level of the modeled reservoir 106" will be more heterogeneous.

Figure 7:
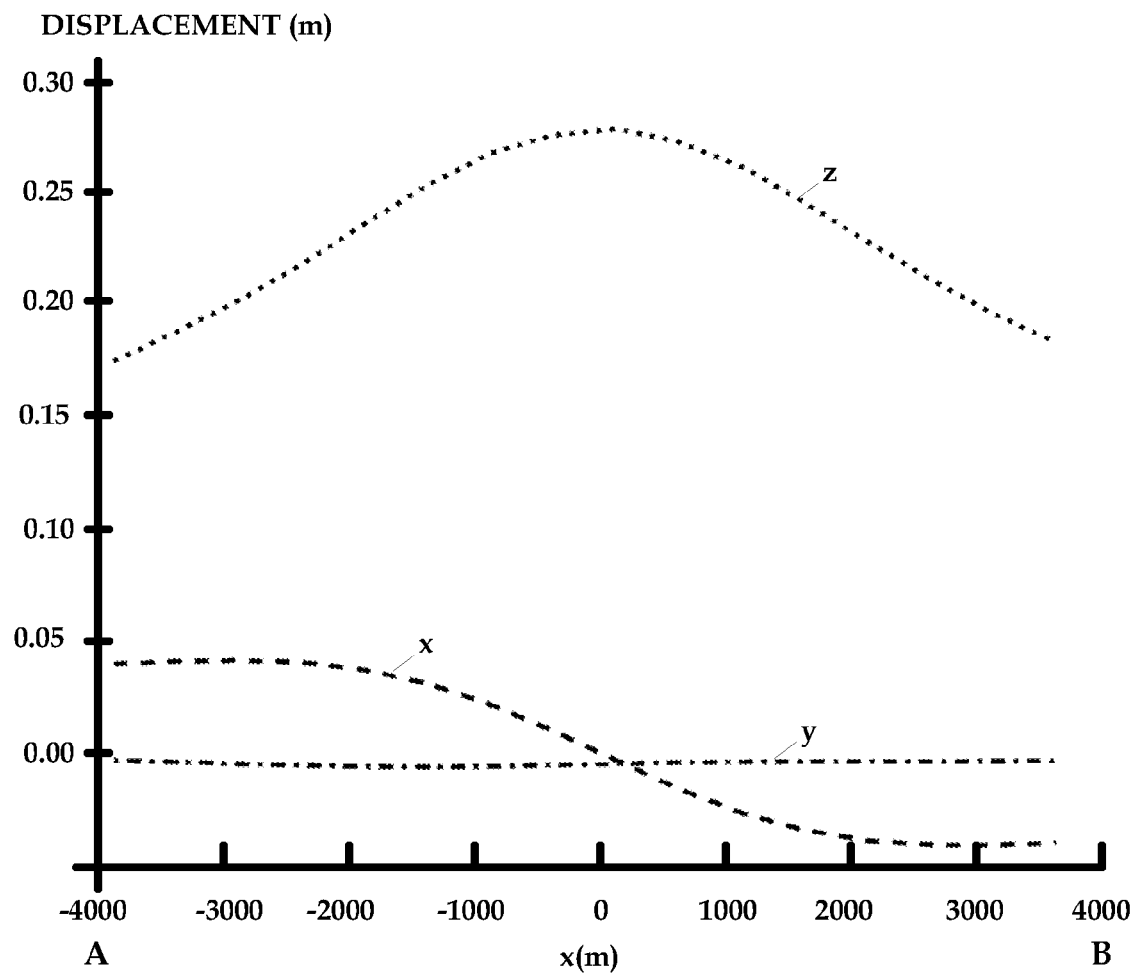
FIG. 7, which illustrates displacement along the x-, y-, and z-axes along the central profile A-B first shown in FIG. 6.

The effects of production from the modeled reservoir 106" on stress fields and seismic attributes will now be discussed further with reference to a central profile 606, extending from point A to point B, and an offset profile 609, extending from point C to point D. In one case study, production from the modeled reservoir 106" over three years of simulation resulted in a maximum vertical displacement (i.e., subsidence) of 30 cm and a horizontal displacement of 5 cm at the modeled surface 112". The resulting compaction generated a maximum vertical displacement of 48 cm at the seal 600, shown in FIG. 6. Note that the displacements have x-, y-, and z-components, and that:

(i) FIG. 7 illustrates displacement in the x-, y-, and z-directions along the central profile 606. Maximum displacement is in the z direction in the center of the field. Displacement in the x direction (i.e., along the profile) is positive at the left and negative at the right, indicating that the rock moves towards the center of the subsidence bowl 615. There is no displacement in the y (i.e., cross-profile) direction.

Figure 8A:
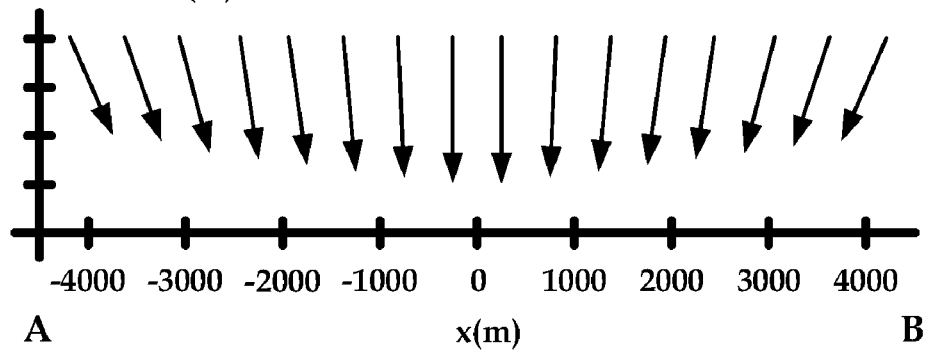
FIGS. 8A-8B illustrate the relative magnitudes and direction of the displacement in the vertical (x-z) and horizontal (x-y) planes along the central profile.
Figure 8B:
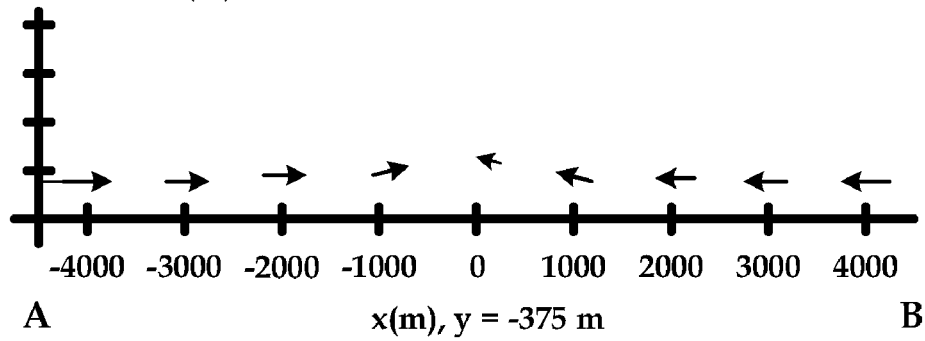

(ii) FIG. 8A-FIG. 8B illustrate the relative magnitudes and directions of the displacement in the vertical (x-z) and horizontal (x-y) planes along the central profile 606 from point A to point B. Note that the plots show that particles move toward the center of the subsidence bowl 615. Vertical displacement dominates and is strongest in the center of the field. Horizontal displacement is zero at the center and is largest at the edges.

Figure 9:
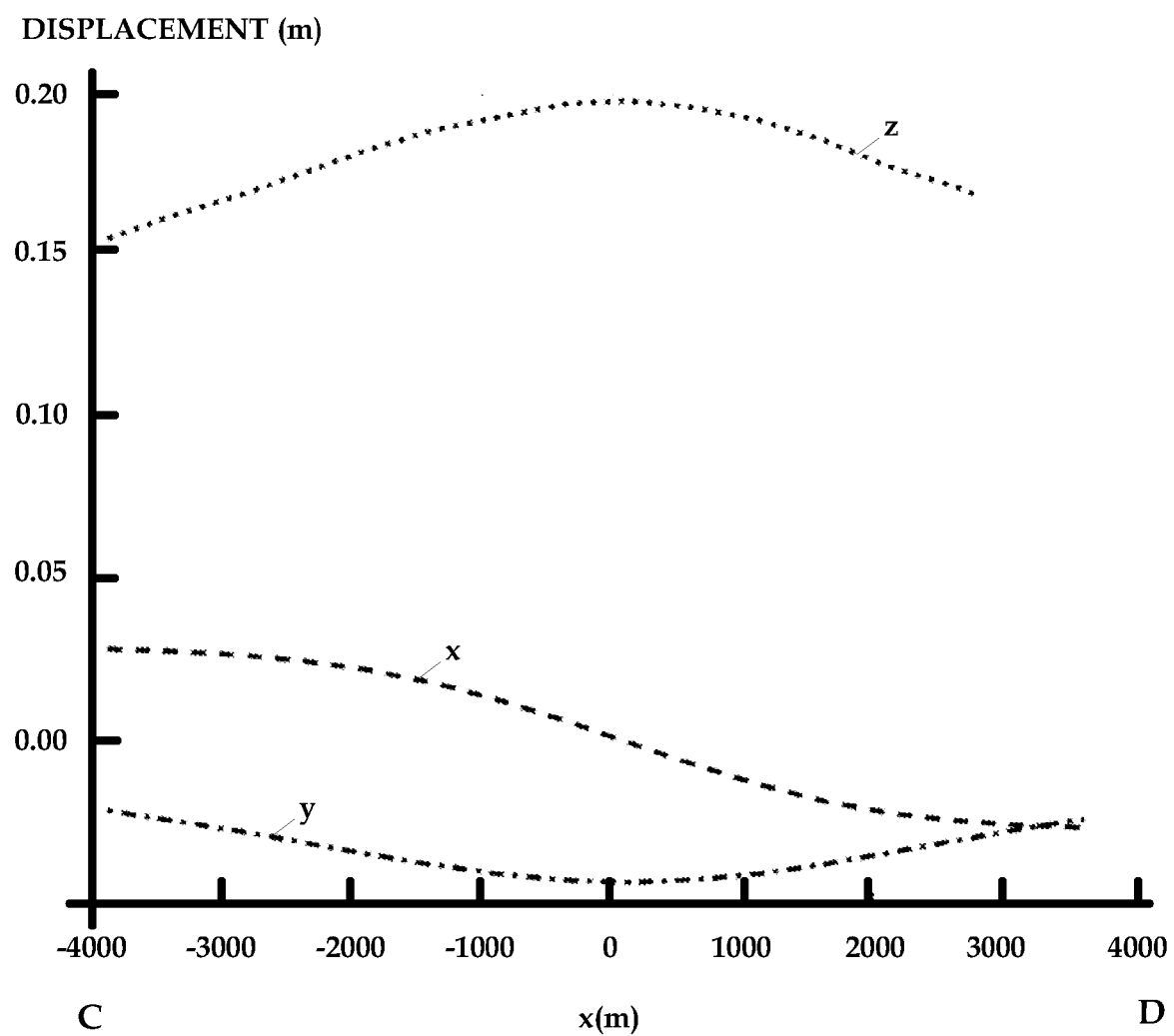
FIG. 9 illustrates displacement along the x-, y-, and z-axes along the offset profile C-D.

(iii) FIG. 9 illustrates displacement in the x-, y-, and z-directions along the southern profile 609. The maximum value of displacement (≅0.2 m) is about ⅔ the maximum displacement of the central profile 606.

Figure 10A:
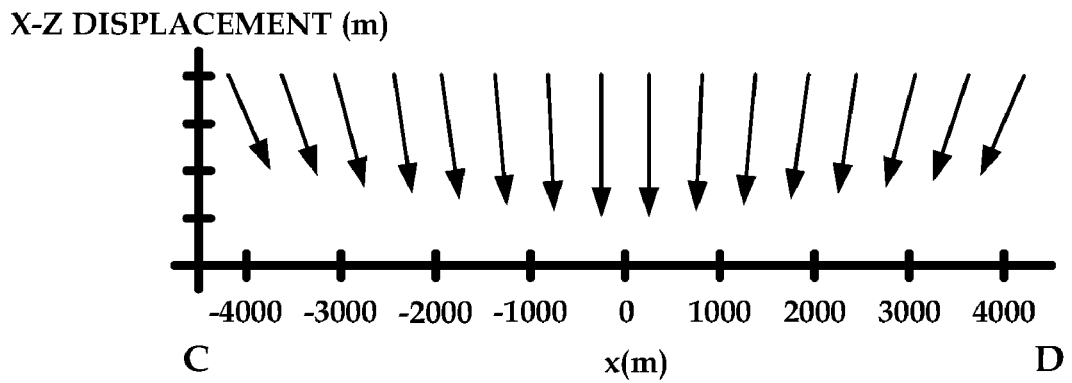
FIGS. 10A-10B illustrate the relative magnitudes and direction of the displacement in the vertical and horizontal planes along the offset profile.
Figure 10B:
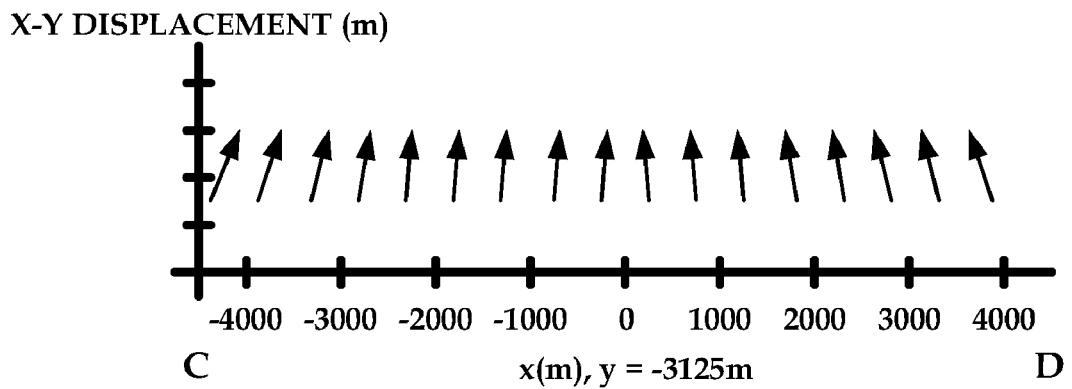

(iv) FIG. 10A-FIG. 10B illustrate the relative magnitudes and directions of the displacement in the vertical (x-z) and horizontal (x-y) planes along the southern profile 609 from point C to point D. Displacements in the vertical plane, shown in FIG. 10A, show a similar pattern as for the center profile 606. That is, particles are displaced toward the center. In the horizontal plane, shown in FIG. 10B, there is a substantial cross-profile displacement, although the displacement vectors point toward the center of the subsidence bowl 615.

The difference in the displacements between neighboring cells 603 can be used to calculate strain in the geological formation 109'. Note that FIG. 8A-FIG. 8B and FIG. 10A-FIG. 10B indicated that the strains are greatest at the center of the subsidence bowl 615.

Figure 11:
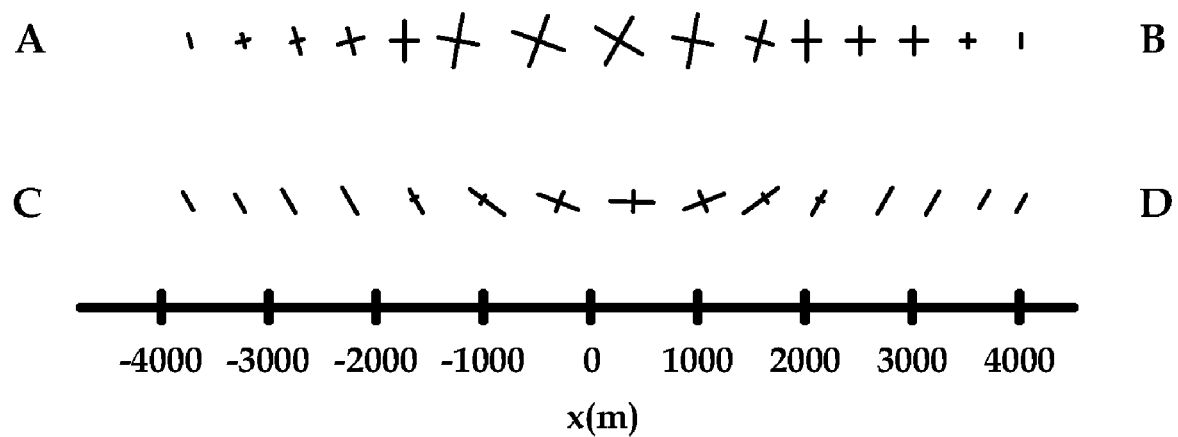
FIG. 11 illustrates the orientation and relative magnitudes of the horizontal principal stress changes along the central and offset profiles in the context of the subsidence bowl.

FIG. 11 illustrates the orientation and relative magnitudes of the changes in horizontal principal stresses along the central and offset profiles 606, 609 in the context of the subsidence bowl 615. The stress changes were calculated from strains by using Hooke's law. The changes in principal stresses are towards a more compressive stress regime and the directions of the principal stresses are either parallel or perpendicular to the contours of the subsidence bowl 615. In the case study previously mentioned, the maximum principal stress change was −0.04 MPa. Note that the maximum compressive stresses are in the center of the subsidence bowl 615. These stresses are isotropic, so they will not cause azimuthal anisotropy in elastic properties, and therefore will not cause shear wave splitting. The difference in changes in horizontal stress gets successively larger towards the edges of the model. Consequently, shear wave splitting is more dominantly observed towards the edges of the subsidence bowl.

As previously mentioned, the stress is of interest because of its affect on observable seismic attributes of the modeled geological formation 109". Observable seismic attributes include, for example:

(i) the traveltime of seismic waves, e.g. the seismic waves 136, 142, shown in FIG. 1, propagating through the modeled geological formation 109";

(ii) the amplitude of the seismic waves;

(iii) the shape of the seismic wavelet (i.e., frequency content);

(iv) the shape, amplitude, and traveltime of the seismic waves as a function of offset and azimuth (e.g., NMO, AVO, AVAz);

(iv) the shape, amplitude, and traveltime of the seismic waves as a function of wavetype (e.g., compressional waves, shear waves, converted waves and surface waves); and (v) the shape, amplitude, and traveltime of the seismic waves as a function of survey geometry (e.g., reflection, VSP, cross-well, passive seismic experiments).

Those in the art having the benefit of this disclosure will appreciate that this list is illustrative and is neither exclusive nor exhaustive.

Figure 12:
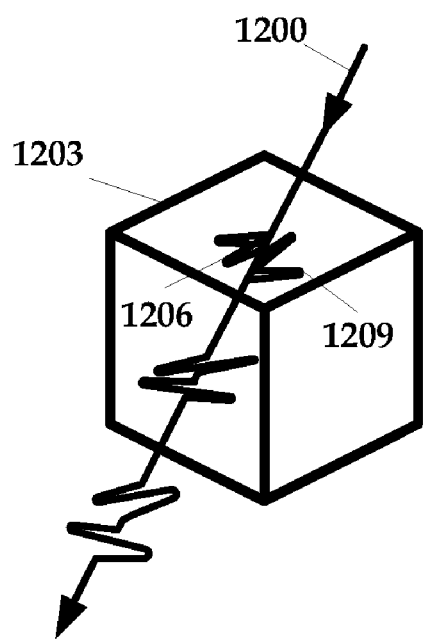
FIG. 12 illustrates a phenomenon known in the art as "shear wave splitting"

For instance, some of the observable seismic attributes are more subtle. FIG. 12 illustrates a phenomenon known in the art as "shear wave splitting". When a shear wave 1200 encounters a region 1203 of anisotropy in the geological formation 109', the shear wave 1200 can split into two wavelets 1206, 1209. The wavelets 1206, 1209 will travel at different velocities from one another as a function of wavelet's polarization determined by the anisotropy in the modeled geological formation 109". If the source of the seismic anisotropy is stress, the polarizations of the wavelets 1206, 1209 will be determined by the stress state of the geological formation 109". Since the wavelets 1206, 1209 travel at different velocities, there will be a time delay between the arrival of the fast and the slow shear wave. Both the time delay and the polarization directions of the wavelets 1206, 1209 are typically seismic attributes of interest.

To illustrate the point of shear-wave splitting in another way, consider a vertically traveling shear wave 1200 propagating through a vertically fractured medium 1203. If a shear wave 1200 is generated with a polarization direction (i.e., the trajectory of particle movement as the seismic wave passes) in such a way, that the polarization direction is not aligned with either the fracture strike of the fracture normal, the shear wave splits into two waves, or wavelets, 1206, 1209. The fast shear wave (e.g., the wavelet 1206) is polarized in the direction of the fracture strike and the slow shear wave (e.g., the wavelet 1209) is polarized in the direction of the fracture normal. For a stressed medium with one of the principal stresses aligned with the vertical direction, the fast shear wave direction (traveling vertically) is polarized in the direction of maximum horizontal principal stress and the slow shear wave is polarized in the direction of minimum horizontal principal stress. It is then possible to measure the polarization directions of the two shear waves and the time lag between the two arrivals. Interestingly, studies have shown a close correspondence between the contours of a subsidence bowl 615 created by compaction over a reservoir and the polarization directions of fast shear wave arrivals.

In general, as will be apparent to those skilled in the art having the benefit of this disclosure will appreciate, the seismic attributes that may be affected will be dependent on the structure and composition of the geological formation. Returning to FIG. 5A-FIG. 5B, for instance, shear wave splitting is particularly strong at shallower depths, e.g., the layers of unconsolidated sediments 500a-500c, whereas increased travel times of p-waves may be particularly suitable to characterize the soft layer of 500e-500g'; microseismics may be used to characterize the fault 503 and the fracturing of the caprock 500k; AVOAz effects could be used to determine properties of the fault 503, the caprock 500k, and the reservoir 106a-106c; changes of reflection coefficient are expected during production from the fault 503 and the interfaces separating the caprock layer 500k and the reservoir 106a-106c; and a traveltime decrease can be expected in the reservoirs 106a-106c. Thus for each region or layer of interest, and the geomechanical processes that occur in them, different seismic attributes may be used to probe the processes that happen within these regions. Note that this may also influence the choice of seismic technique applied (e.g., reflection seismics, passive seismics, X-well, VSP) by which seismic data is acquired, as some techniques are more suitable to certain types of geomechanics or reservoir monitoring than are others. Also, the reservoir type will have an influence on which seismic technique and which attributes may be suitable. For example, microseismic activity (i.e. miniature Earthquakes) will generally only occur in rocks that fail by creating fractures, whereas other rocks may react to similar deformations by creeping, which will not release seismic energy.

As was mentioned above, the present invention can be used to estimate the perturbations in stress over time and estimate its affect on seismic attributes of interest. This particular embodiment is illustrated in FIG. 13, in which a method 1300 begins by first deriving (at 1303) the triaxial stress state of the geological formation 109' and then determining (at 1306) at least one seismic attribute of the modeled geological formation 109". The triaxial stress state can be derived (at 1303) using the method 200, shown in FIG. 2, and especially as manifested in the method 300, shown in FIG. 3.

The simulated stresses illustrated in FIG. 7, FIG. 8A-FIG. 8B, FIG. 9, and FIG. 10A-FIG. 10B can then be input to, e.g., the stress sensitive rock physics model 415, shown in FIG. 4B. The stress sensitive rock model can then yield a velocity distribution for a particular state of the stress field. Some additional inputs may be useful, including compressional wave velocity ("$v_p$"), shear wave velocity ("$v_s$"), and density of the medium ("$\rho$") at a reference stress state, as well as the coupling coefficients for the non-linear rock physics model. Additional accuracy can be achieved by incorporating additional information, such as the rapid increase in velocity with depth for the region under investigation, coupling coefficients for soft sediments, or by calibration of the rock physics model by comprehensive measurements on cores.

Figure 14A:
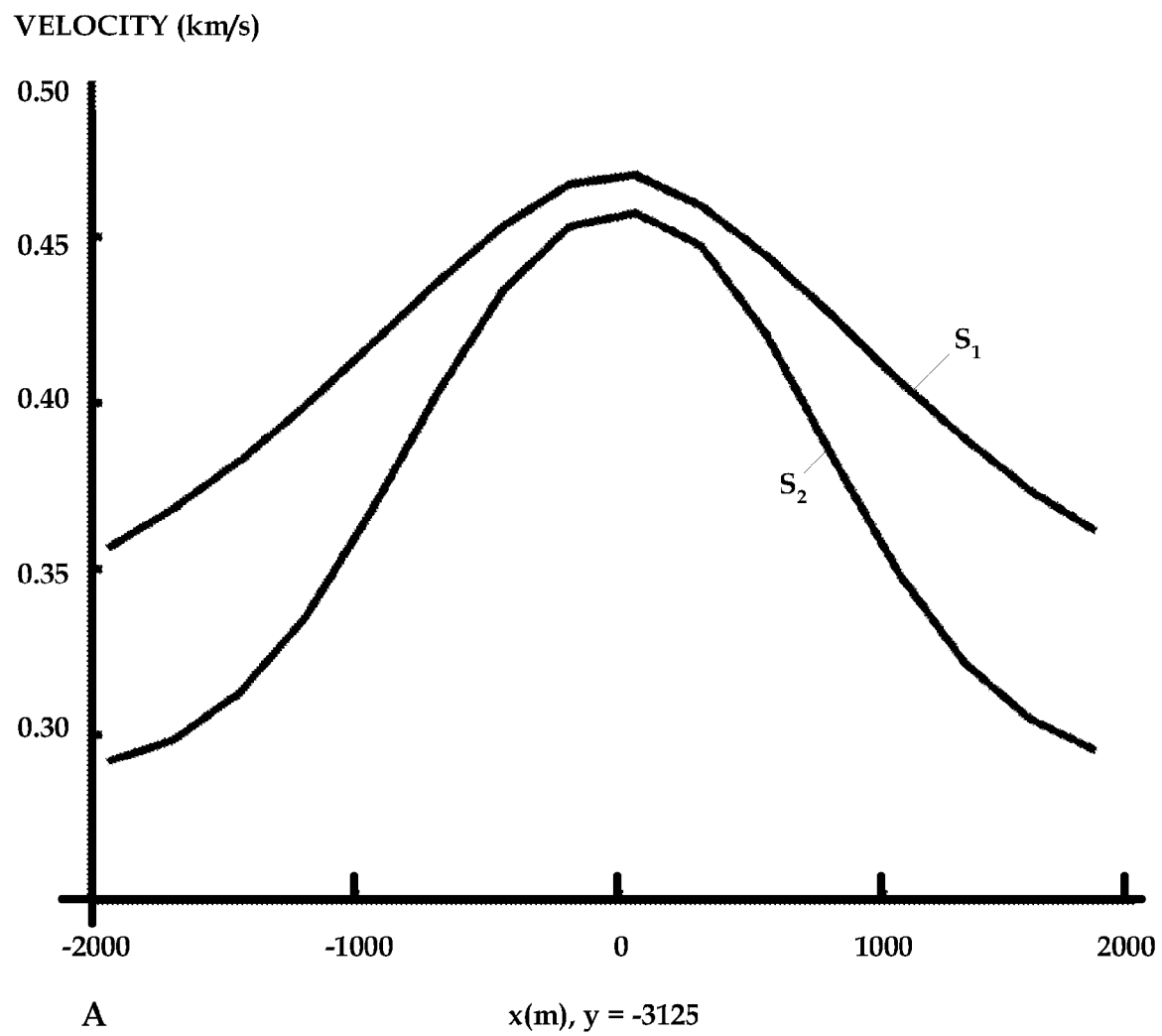
FIGS. 14A-14D graph the fast ("$S_1$") and slow ("$S_2$") shear wave velocities and the time lag therebetween along the central and southern profiles, respectively, of the modeled geological formation shown in FIG. 6.
Figure 14B:
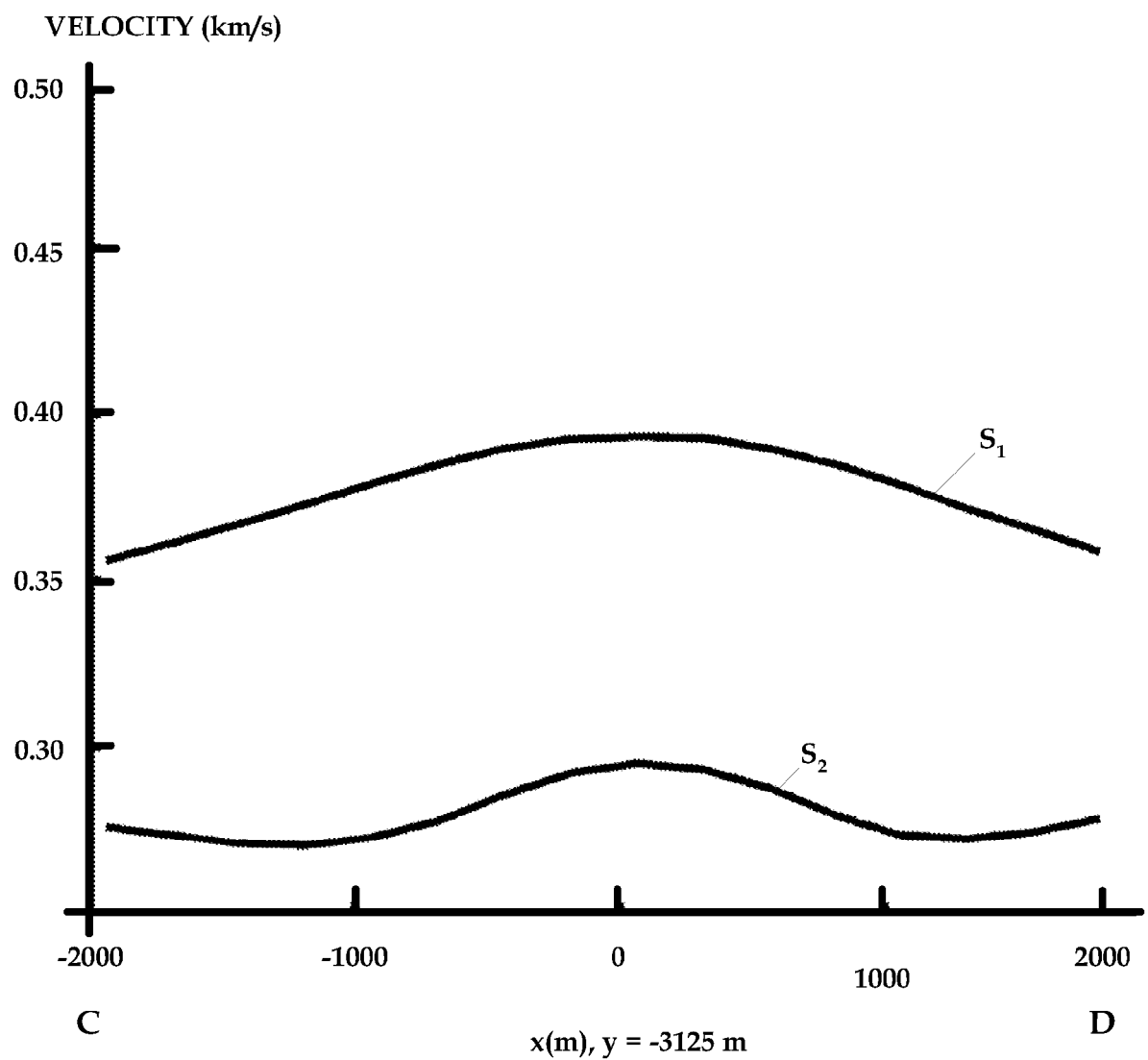

FIG. 14A-FIG. 14D and FIG. 17-FIG. 18 illustrate various seismic attributes of the modeled geological formation 109" in FIG. 6 obtained using the method 1300 of FIG. 13 in the illustrated embodiment. FIG. 14A-FIG. 14B graph the fast ("$S_1$") and slow ("$S_2$") shear wave velocities along the central and southern profiles 606, 609, respectively. For this particular embodiment, inputs for the model in an unstressed state typical of shallow North Sea sediments were used, including $v_p$=1200 m/s, $v_s$=300 m/s, and $\rho$=1.8 g/cm$^3$. Furthermore, a vertical layer thickness of 100 m was assumed. The coupling coefficients $c_{111}$, $c_{112}$, and $c_{123}$ were taken from Prioul et al. (2004), cited above, and are −3100, −800, and 40, respectively. Applying the stress sensitive rock physics model 415 and using the stresses shown in FIG. 11 results in the velocity profiles shown in FIG. 14A-FIG. 14B. Due to the anisotropic nature of the stress field, elastic anisotropy ensues, shear wave splitting occurs, and a fast and a slow shear wave are generated. Along the central profile 606, the fastest shear velocities are observed at the center 618 of the subsidence bowl 615. Since the two principal horizontal stresses are approximately equal, there is very little difference in fast and slow shear wave velocities. At the beginning and end of the central profile 606, the two principal horizontal stresses are very different and, accordingly, the fast and slow shear wave velocities are very different.

Figure 14C:
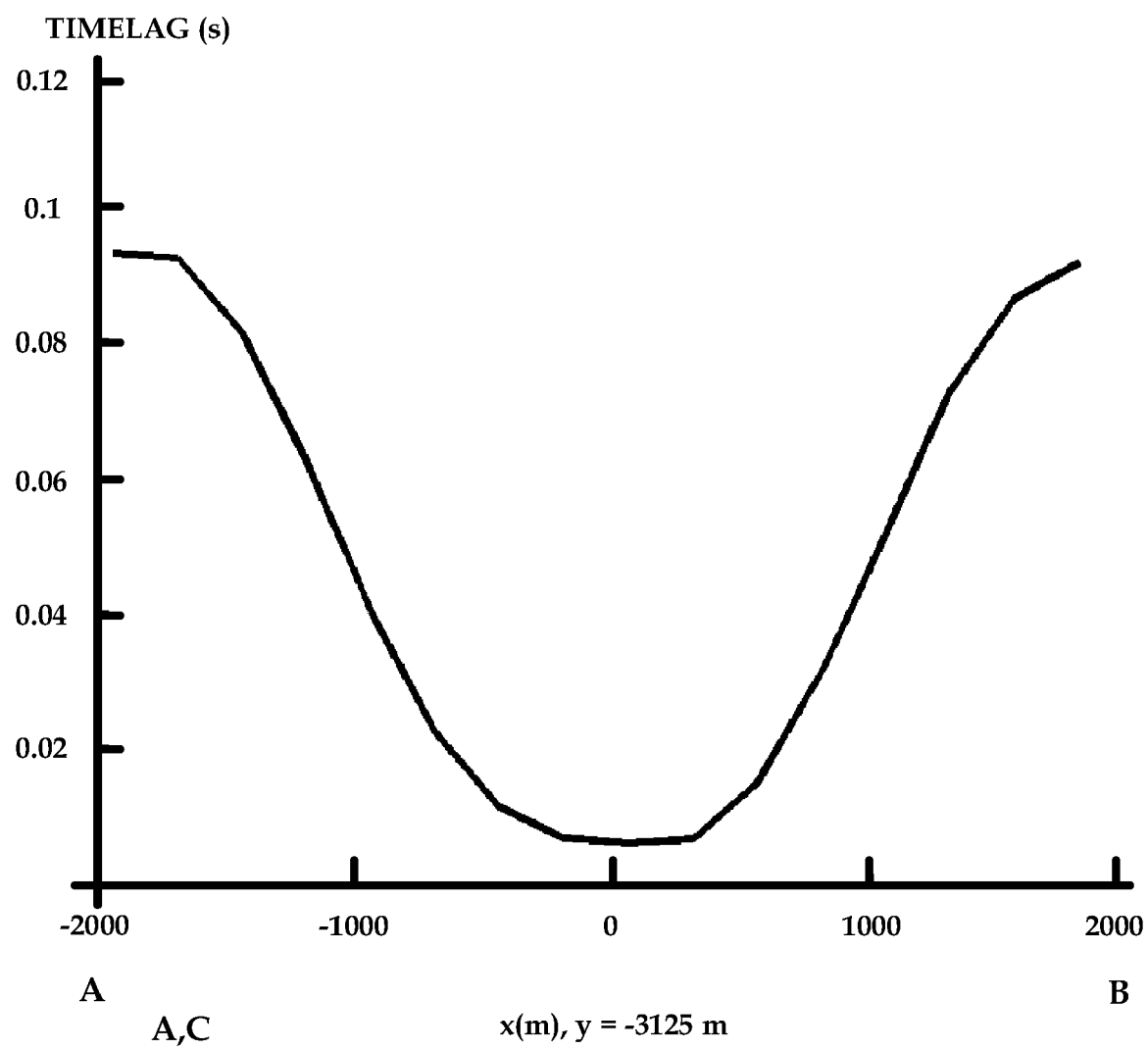
Figure 14D:
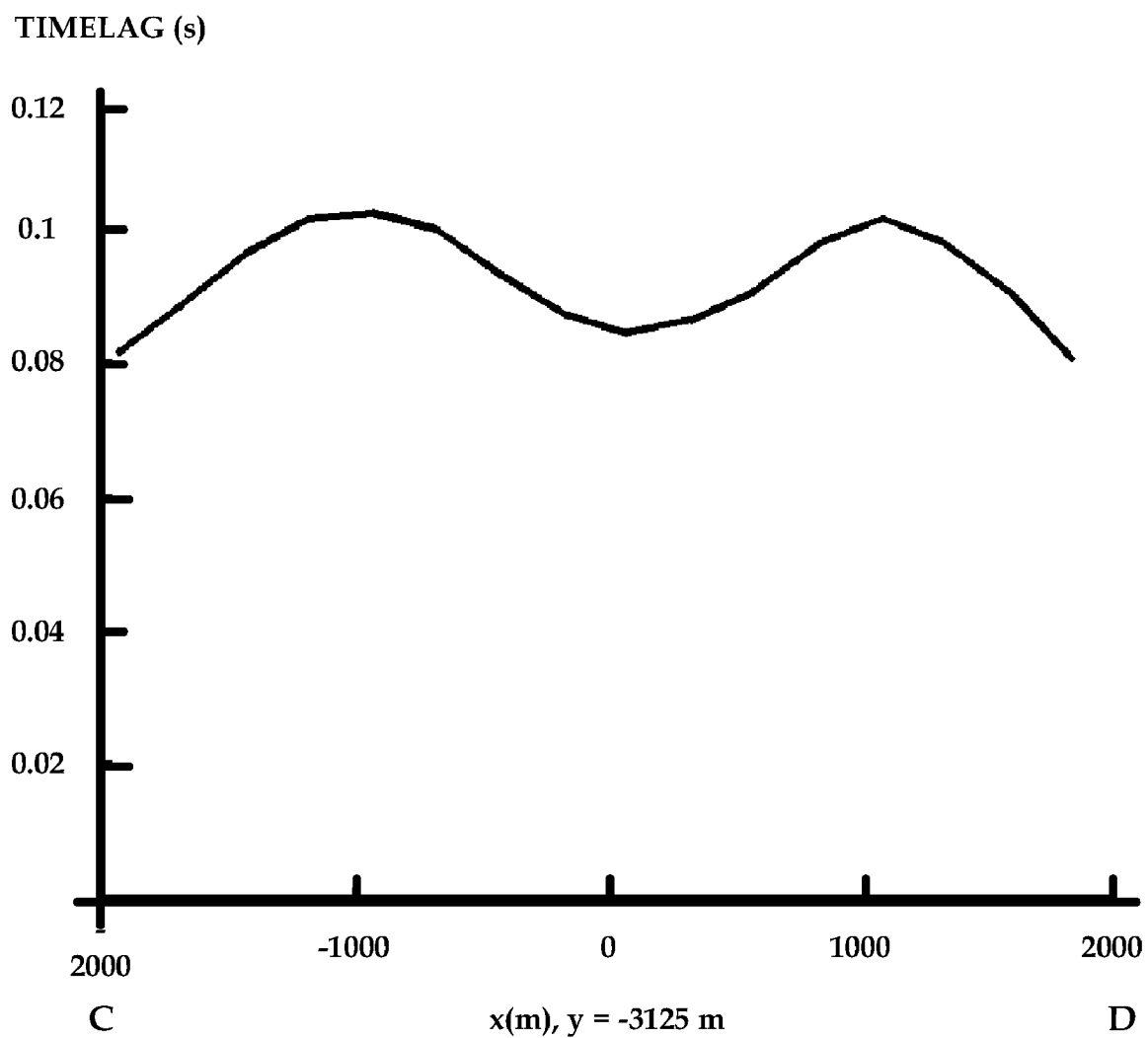

Notably, the largest change in vertical shear wave velocity occurs at a location at which no shear wave splitting is observed. It is here that the largest time-lapse velocity change occurs. FIG. 14A-FIG. 14B also demonstrate the link between shear wave splitting and subsidence and seismic observations thereof. FIG. 14C and FIG. 14D graph the time lag between the fast and slow shear wave arrivals along the central and southern profiles 606, 609, respectively.

Figure 15A:
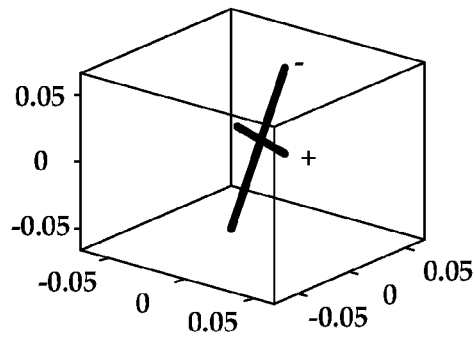
FIG. 15A-FIG. 15D illustrate the stress changes at a particular location in the seal of the modeled geological formation shown in FIG. 6.
Figure 15B:
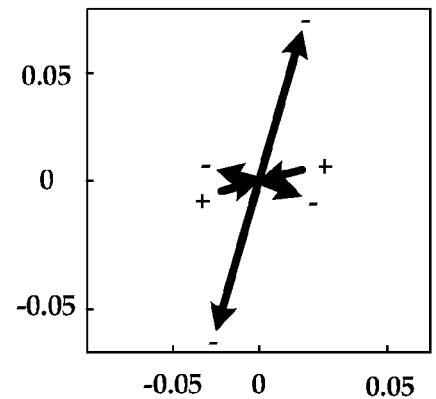
Figure 15C:
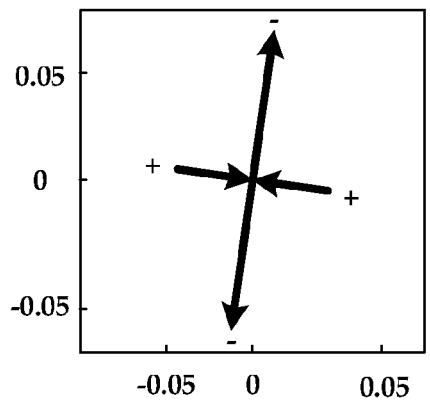
Figure 15D:
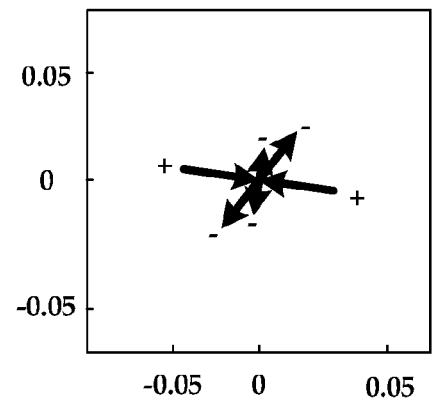
Figure 16A:
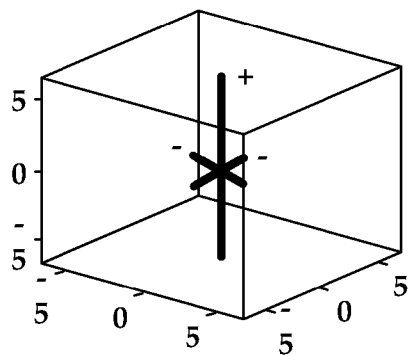
FIGS. 16A-16D illustrate the stress changes at a particular location in the modeled reservoir of the modeled geological formation shown in FIG. 6.
Figure 16B:
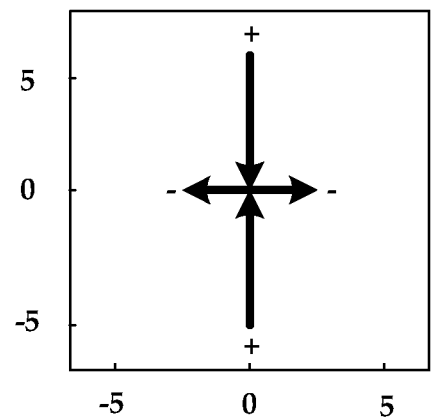
Figure 16C:
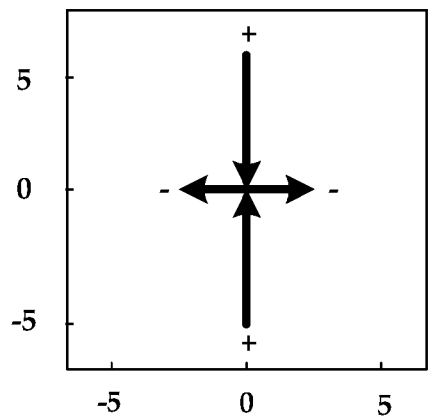
Figure 16D:
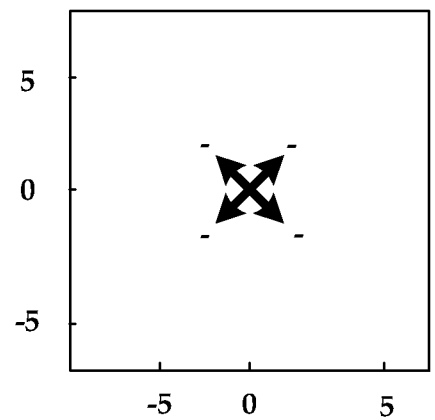

FIG. 15A-FIG. 15D and FIG. 16A-FIG. 16D illustrate the stress changes in the seal 600 and modeled reservoir 106", both shown in FIG. 6. FIG. 15A and FIG. 16A are generated by calculating the Eigenvalues and Eigenvectors of the change in (effective) stress tensor. The Eigenvectors (of length one) are scaled by absolute value of the Eigenvalue for all three Eigenvalues. FIG. 15B-FIG. 15D and FIG. 16B-FIG. 16D are projections into the respective y-z, x-y, and x-z planes of FIG. 15A and FIG. 16A, respectively. The units of measure are stress-change in MPa. Within the seal 600, maximum stress change is in a sub-vertical direction with a tensile change −0.05 MPa. Within the reservoir, maximum stress change occurs in the vertical direction, with a magnitude of approx. +5 MPa. Stress changes can be positive ("+"), (i.e., more compressive), or negative ("−"), (i.e., less compressive). The total initial stresses are approximately +50 MPa (i.e., a compressive stress regime). The stress changes plotted are a perturbation of the initial state due to reservoir production (pressure change) and associated rock deformation.

In the seal 600, as is shown in FIG. 15A-FIG. 15D, stress change in the vertical direction is towards a less compressive regime. This is explained by a stretching of the seal to accommodate reservoir compaction. Note the anisotropic nature of the stress field: of the two remaining principal stresses one is positive and one is negative. Note also, the tilt of the principal axis of the largest stress change from the vertical.

In the modeled reservoir 106", as is shown in FIG. 16A-FIG. 16D, stress change in the vertical direction is positive and therefore more compressive. This is explained by reduction of pore pressure and consequently additional load from overburden, which was carried by the over-pressure, is now transferred to the rock matrix. Changes in principal horizontal stresses are towards less compressive regimes and are isotropic.

In the stress sensitive rock model, in the illustrated embodiment, the initial state assumes that the compressional wave and shear wave velocities in the seal 600 and the modeled reservoir 106" are isotropic and equal. Thus, any reflection in the later state is then purely a result of stress changes in the modeled reservoir 106" and the seal 600. For simplicity, the illustrated embodiment aligns the triaxial state with the coordinate axes. To that end, the Eigenvalues of the stress tensor (i.e., the lengths of the arrows in FIG. 15B-FIG. 15D and in FIG. 16B-FIG. 16D) are used and the slight inclinations of the Eigenvectors with the coordinate axes are ignored. Thus, in the illustrated embodiment, the stress tensors used in the rock-physics model contain the Eigenvalues along the main diagonal of the stress tensor. The stress tensor in the seal 600 is:

$$\begin{bmatrix} -0.030 & 0 & 0 \\ 0 & 0.003 & 0 \\ 0 & 0 & 0.0617 \end{bmatrix}$$

and for the modeled reservoir 106":

$$\begin{bmatrix} 1.007 & 0 & 0 \\ 0 & 1.033 & 0 \\ 0 & 0 & -5.435 \end{bmatrix}$$

Since the first two of the Eigenvalues in the stress tensors above are approximately equal, the seismic stiffness tensors display almost vertical transverse isotropy ("VTI") symmetry. Thomsen parameters can therefore be used to describe the stiffness tensor.

Table 1 and Table 2 illustrate the velocity changes in the seal 600 and the modeled reservoir 106" in Thomsen parameters, which is a notation well known and commonly understood in the art. The changes in Thomsen parameters (velocity+anisotropy parameters) in the seal 600 are almost negligible. The changes in Thomsen parameters in the modeled reservoir 106" are marked, with a change in anisotropy of almost 2.5% and a change in vertical compressional wave and shear wave velocities of 1.8% and 0.5%, respectively. Note that the changes in the Thomsen $\epsilon$ and $\delta$ are both negative and equal. This implies elliptical anisotropy, and stress-induced anisotropy displays this characteristic using the applied, non-linear rock physics model. The negative change in $\epsilon$ could be significant as a diagnostic tool. Thomsen $\epsilon$ is usually positive for sediments and a change towards smaller values in a time-lapse seismic study could be a valuable diagnostic tool.

TABLE 1

Velocity Changes in Seal

| Initial State | Later State |
|---|---|
| $\alpha$ = 3.110 km/s | $\alpha$ = 3.109 km/s |
| $\beta$ = 1.530 km/s | $\beta$ = 1.529 km/s |
| $\epsilon$ = 0.000 | $\epsilon$ = 0.000361 |
| $\delta$ = 0.000 | $\delta$ = 0.000326 |
| $\rho$ = 2.540 g/cm$^3$ | $\rho$ = 2.540 g/cm |

TABLE 2

Velocity Changes in Modeled Reservoir

| Initial State | Later State |
|---|---|
| $\alpha$ = 3.110 km/s | $\alpha$ = 3.168 km/s |
| $\beta$ = 1.530 km/s | $\beta$ = 1.538 km/s |
| $\epsilon$ = 0.000 | $\epsilon$ = -0.024 |
| $\delta$ = 0.000 | $\delta$ = -0.024 |
| $\rho$ = 2.540 g/cm$^3$ | $\rho$ = 2.540 g/cm$^3$ |

Figure 17:
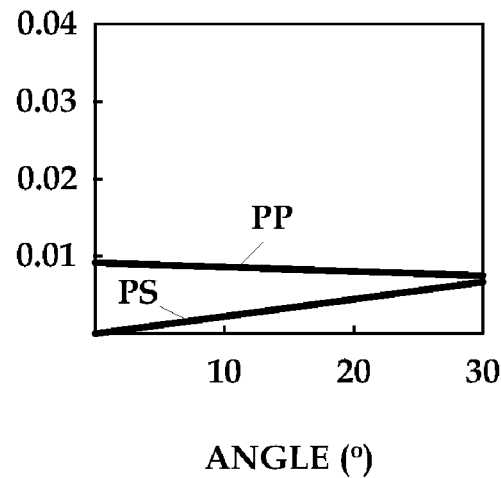
FIGS. 17 and 18 demonstrate how the AVO response depends on the employed rock physics model.
Figure 18:
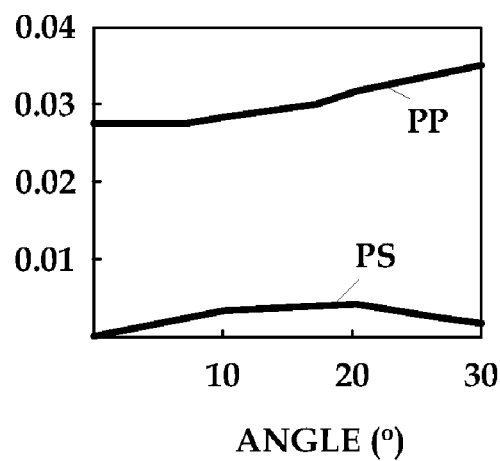

Another seismic attribute that may be extracted is the AVO response. FIG. 17-FIG. 18 demonstrate how the AVO response depends on the rock physics parameters employed. FIG. 17 presents the AVO (or, more precisely, the amplitude vs. angle) response of the reservoir-seal interface due to stress changes in a high stress regime and consequently coupling coefficients for the stress sensitive rock physics model are chosen accordingly. Note that the pre-production modeled reservoir 106" and the seal 600 were assigned the same velocities, so this response is purely stress-induced. In some alternative embodiments, besides stress changes (including pore pressure), saturation changes and other kinds of changes may be taken into account. FIG. 18 illustrates how the AVO response changes, if coupling coefficients for a low stress regime in the rock physics model are employed. A comparison of FIG. 17 and FIG. 18 illustrates how the changes in elastic properties due to stress depend on the applied conversion from stress to stiffness via a rock physics model.

Note that the AVO response depends strongly on the employed constants in the rock physics model. Consequently, in embodiments using such a stress sensitive rock model, the model should be carefully calibrated. On the other hand, the constants can possibly be resolved from seismic measurements with relative accuracy, since the seismic response is strongly dependent on these constants.

A method such as the method 1300 can then be used to conduct feasibility studies, whereby the magnitude of stress-effects (and other changes in physical properties in the reservoir) on seismic data for different production scenarios can be estimated. It also permits quantification of whether changes in the stress-regime are large enough to be detected by seismic monitoring. It furthermore allows estimation of the relative contributions to seismic time-lapse changes from stress and other production related changes in the reservoir. Another application of method 1300 could be to predict stress effects on seismic data, which can then be used to remove these effects from time-lapse field data. The remaining time-lapse changes can then be more safely ascribed to fluid and saturation changes.

This embodiment can furthermore be used for experimental design and sensitivity studies. Using this workflow, the seismic time-lapse changes can be calculated for a variety of attributes and experimental geometries. Consequently, the attributes and experimental geometries that show the largest sensitivity to changes in the stress-regime can be identified and used in a field experiment. Seismic attributes that could be used to monitor time-lapse stress effects include changes in traveltime for compressional waves, shear waves and converted waves, changes in amplitudes, changes in NMO-velocities, shear-wave splitting observations and changes in reflection amplitudes as function of source-receiver offset (AVO) and source-receiver azimuth (AVAz). The recording of these time-lapse changes should not be restricted to sources and receivers at the Earth's surface or the sea bottom. These changes could possible be monitored more reliably with instruments that are placed inside boreholes or a combination of surface seismic and borehole seismics.

However, the invention is not limited to deriving seismic attributes and the use to which such attributes can be employed. For instance, the method 1900, shown in FIG. 19, is one particular embodiment in which the present invention may be used to evaluate the accuracy of estimates of the stress field in the geological formation 109' using complementary sources of information. The method 1900 derives (at 1903) the triaxial stress state of the geological formation 109' from reservoir and geomechanical modeling. Again, the triaxial stress state can be derived (at 1903) using the method 200, shown in FIG. 2, and especially as manifested in the method 300, shown in FIG. 3. Note that the first and second estimates may be generated either in series or in parallel. If generated in series, either may precede the other.

The method 1900 also separately generates (at 1906) a second estimate of the triaxial stress state. The second estimate is generated (at 1906) by first acquiring (at 1909) a plurality of seismic data. The seismic data may be acquired using any of the techniques described above in association with FIG. 1. As with the scenario in FIG. 1, the seismic data may be acquired specifically for use with the invention or may have been previously acquired and archived.

Seismic attributes (e.g., NMO, AVAz, shear wave splitting parameters, etc.) are extracted (at 1912) from the acquired seismic data and applied to an anisotropic elastic velocity model (not shown) to determine (at 1915) anisotropic, elastic properties of the geological formation 109' from extracted seismic attributes. Techniques for performing this task are well known in the art, and any suitable technique may be employed. Thus, those in the art having the benefit of this disclosure will be able to readily select a technique, understand which seismic attributes are useful for that technique, and then be able to apply the technique to the attribute. Note that the selection of anisotropic elastic velocity model may influence which seismic attributes are extracted (at 1912) and vice-versa in various alternative embodiments. The anisotropic, elastic properties of geological formation 109' are then applied (at 1918) to an inverse stress sensitive rock physics model (not shown) to separately generate (at 1906) the second estimate of the triaxial stress state. Inverse stress sensitive rock physics models are also well known in the art, and any suitable one may be used.

The two independent stress estimates are then compared (at 1921). If the two estimates are similar, the results are deemed more reliable than results derived using each method by itself. If there is no close agreement in the stress-field estimates from the two methods, the reservoir/geomechanical model, the velocity model and the rock physics parameters and correlations can be iteratively updated until the two stress-estimates match.

In a third embodiment, the present invention is used for time-lapse reservoir monitoring including stress effects, fluid-effects and deformation effects using multi-component seismic data and a coupled reservoir/geomechanical simulator. In the previous two embodiments, seismic data and coupled reservoir/geomechanical modeling are used to estimate stress and stress-changes in the subsurface. However, stress changes are not the only physical mechanisms that create time-lapse changes in seismic wave propagation. During reservoir production, the original fluid in place is replaced and consequently the seismic response may change. Furthermore, the position of reflectors can move due to compaction, as was described above. Again, a change in seismic response is associated with this deformation in the subsurface.

Figure 20:
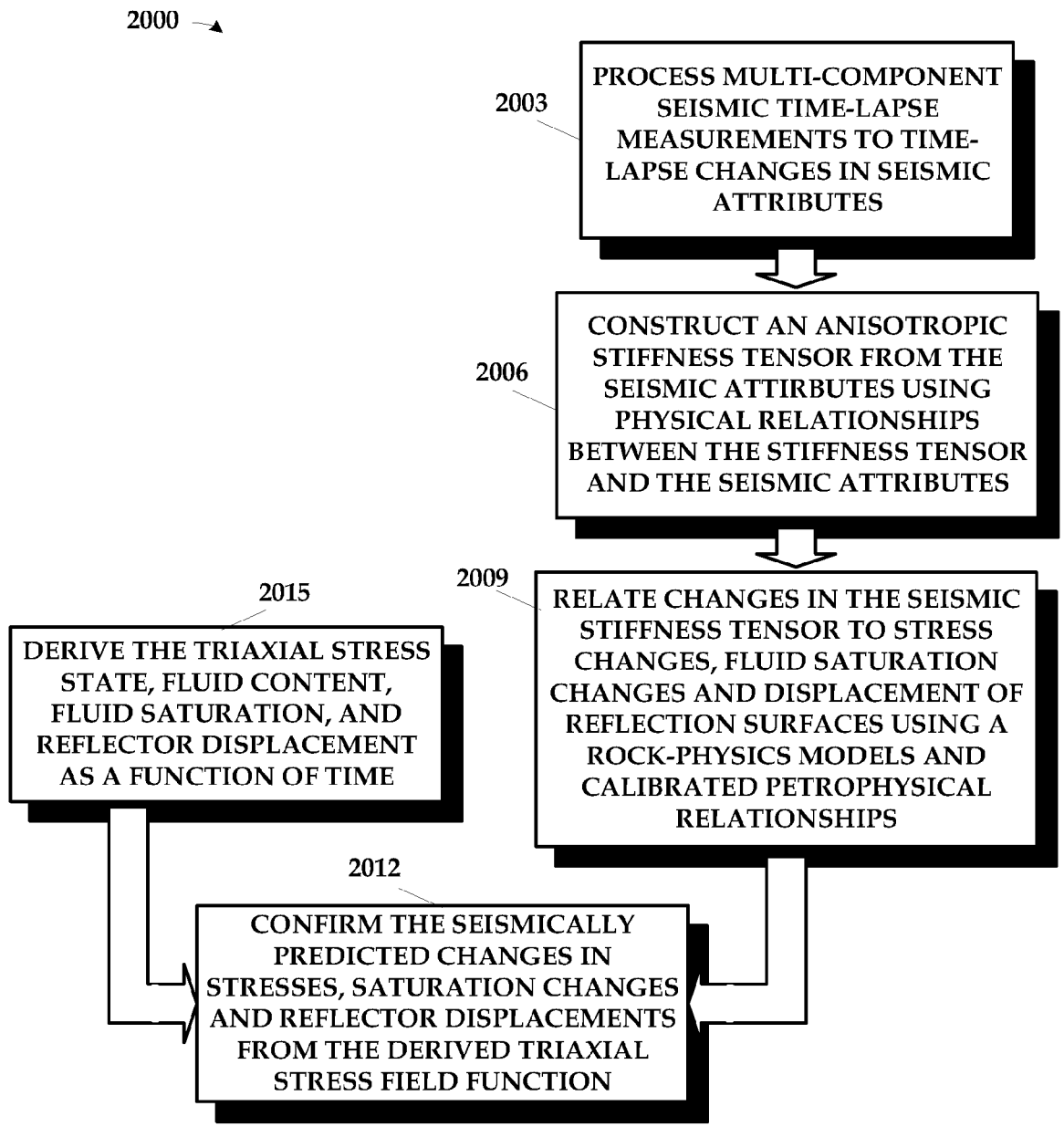
FIG. 20 illustrates one particular embodiment of a method in accordance with the present invention wherein the present invention alternative to those shown in FIG. 13 and FIG. 19.
Figure 21:
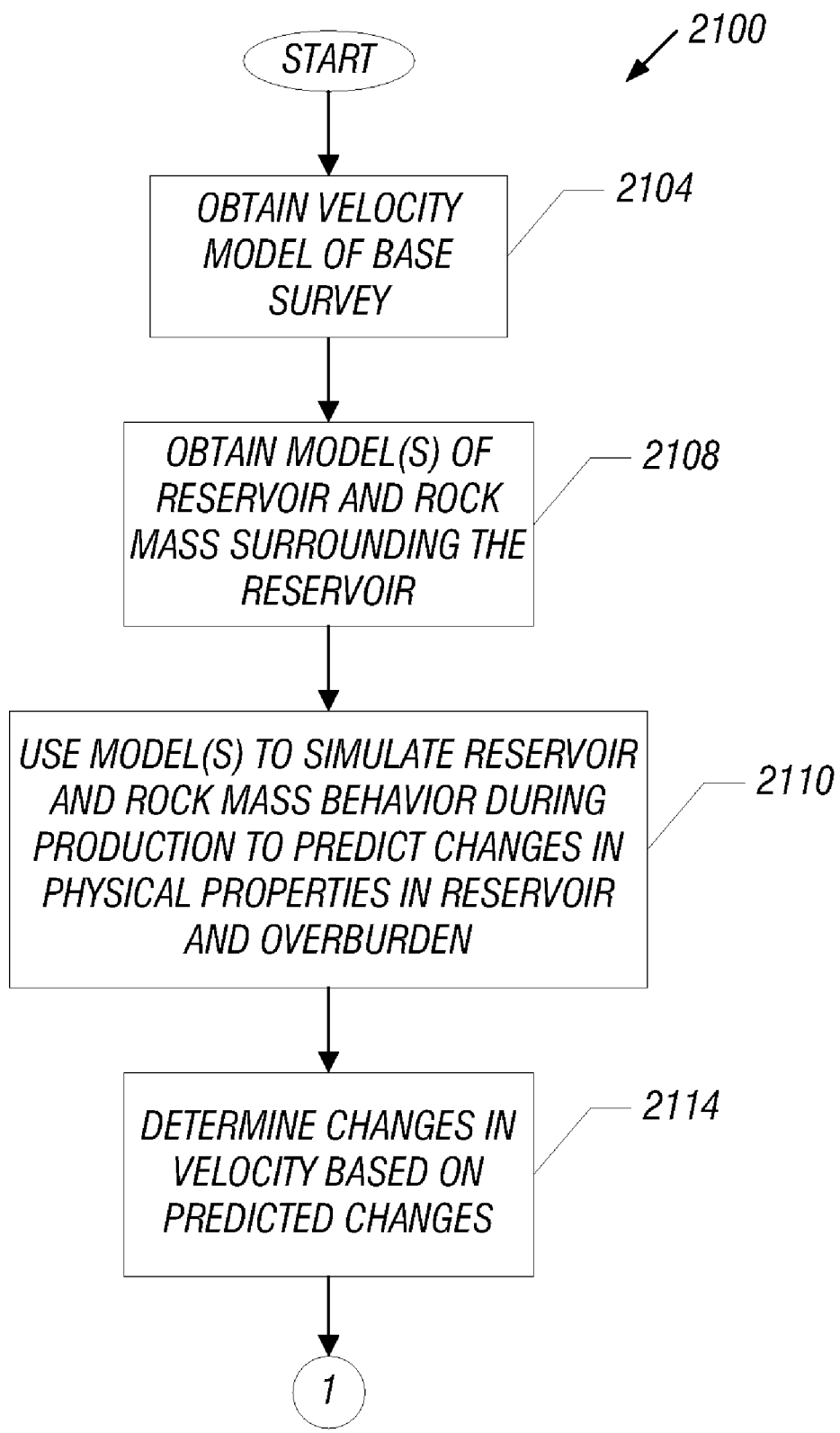
FIGS. 21 and 22 depict a flow diagram illustrating a technique to develop a monitor survey according to an embodiment of the invention.
Figure 22:
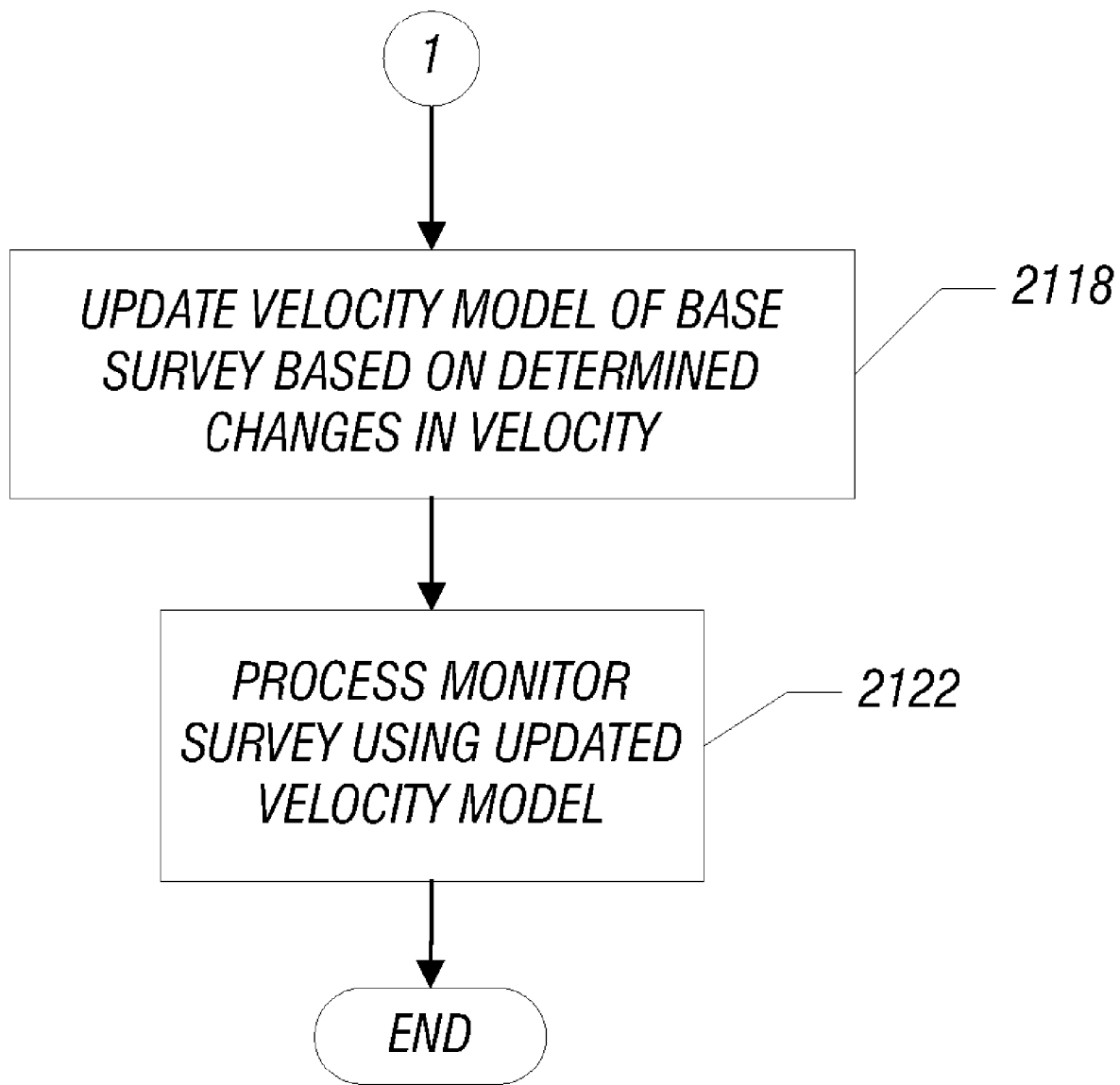

One particular embodiment of a method 2000 for estimating changes in all three properties (stress, fluid content and reflector deformation) is illustrated in FIG. 20. Multi-component seismic time-lapse measurements are processed (at 2003) to time-lapse changes in seismic attributes. Attributes can include, but are not limited to, changes in travel times to selected reflection surfaces, changes in reflection amplitude, changes in reflection amplitude as function of source-receiver offset, reflection angle and/or azimuth, changes in normal-moveout velocity as function of azimuth, shear-wave polarization directions and shear-wave splitting, and time-lapse changes in the frequency content of seismic reflections.

From these seismic attributes, an anisotropic stiffness tensor can be constructed (at 2006) using physical relationships between the stiffness tensor and the seismic attributes as described above. Using a rock-physics models and calibrated petrophysical relationships, changes in the seismic stiffness tensor can then be related (at 2009) to stress changes (including pore pressure), fluid saturation changes and displacement of reflection surfaces. The seismically predicted changes in stresses, saturation changes and reflector displacements can be confirmed (at 2012) by (at 2015) using coupled reservoir and geomechanical modeling as was described above, e.g., using the method 200, shown in FIG. 2, and especially as manifested in the method 300, shown in FIG. 3. More particularly, this embodiment derives (at 2015) the triaxial stress state, fluid content, fluid saturation, and reflector displacement as a function of time.

Thus, the present invention admits wide variation in application. More particularly, some of the problems caused by stress-changes over producing reservoirs which can be addressed using the methods described by this invention include, but are not limited to, (i) anticipation and avoidance of drilling problems;
(ii) prediction of casing deformation and failure;
(iii) prediction of sanding;
(iv) design of well-trajectories;
(v) prediction of opening and closing of conductive pathways in the reservoir;
(vi) reservoir compaction and associated reservoir productivity;
(vii) rock-deformation and stress around salt over compacting fields (e.g., in the GOM);
(viii) prediction and monitoring of fracturing in reservoir and overburden;
(ix) prediction and monitoring of fault-reactivation;
(x) prediction of bedding parallel slip;
(xi) reservoir compartmentalization; and
(xii) monitoring of $CO_2$ sequestration.

However, this list is not exhaustive. Still other uses may become apparent to those skilled in the art having the benefit of this disclosure.

In accordance with some embodiments of the invention, a technique 2100 may be used for purposes of developing a monitor survey. In this regard, a base survey may have been previously developed for a reservoir and surrounding rock mass. This base survey, in turn, may have used a velocity model. Because it may be relatively difficult and time consuming to derive a new velocity model for the monitor survey, conventionally, the velocity model used for the processing of the base survey is used for subsequent monitor surveys. However, instead of using such an approach, in accordance with embodiments of the invention described herein, changes in the velocity model are predicted, and these changes are used to update the previously-used velocity model. The resultant updated velocity model, in turn, is used to process seismic data for purposes of deriving the subsequent survey.

More specifically, pursuant to the technique 2100, a velocity model of a base survey is obtained (block 2104). In this context, a "base survey" refers to the last survey. The last survey may be the original survey or may be what is called a monitor survey taken after the original survey. This velocity model is updated based on the predicted changes in the reservoir and surrounding rock formation, as further described below. Pursuant to the technique 2100, one or more models of the reservoir and rock mass surrounding the reservoir are then obtained, pursuant to block 2108. In this regard, in accordance with some embodiments of the invention, a model of the reservoir and a geomechanical model is obtained; and these models may be coupled to each other. The models are then used, pursuant to block 2110 to simulate reservoir and rock mass behavior during production to predict changes in the physical properties in the reservoir and overburden. For example, the simulated reservoir and rock mass behavior may be used to predict changes in such physical properties as the saturation water, saturation gas, pressure, porosity and temperature.

From the predicted changes, changes in the velocity are then determined (block 2114). From the determined velocity changes, the velocity model of the base survey is then updated, pursuant to block 2118. The monitor survey is then processed using the updated velocity model, pursuant to block 2122.

As a more specific example, in accordance with some embodiments of the invention, the updated velocity model is used for purposes of migration, a process in which the apparent reflection positions are translated to the actual reflection positions, based on the velocity model. The velocity model may be used for other survey processing applications, in accordance with many different possible embodiments of the invention.

The technique 2100 may be performed at least in part by the computer apparatus 400 depicted in FIGS. 4A and 4B. In this regard, it is noted that instructions to provide the reservoir and geomechanical modeling as well as instructions to simulate the reservoir and rock mass behavior, predict changes in the physical properties in the reservoir and overburden, determine changes in the velocity based on the predicted changes, update the velocity of the base survey and process the monitor survey may be performed by one or more microprocessors of the computing apparatus 400, and/or may be performed by multiple processors that are distributed on interconnected computing apparatuses. In another variation, one or more of the above-described computations may be performed separately on non-interconnected computers, may be performed in parallel or may be performed serially. Thus, many variations are possible and are within the scope of the appended claims.

Figure 23:
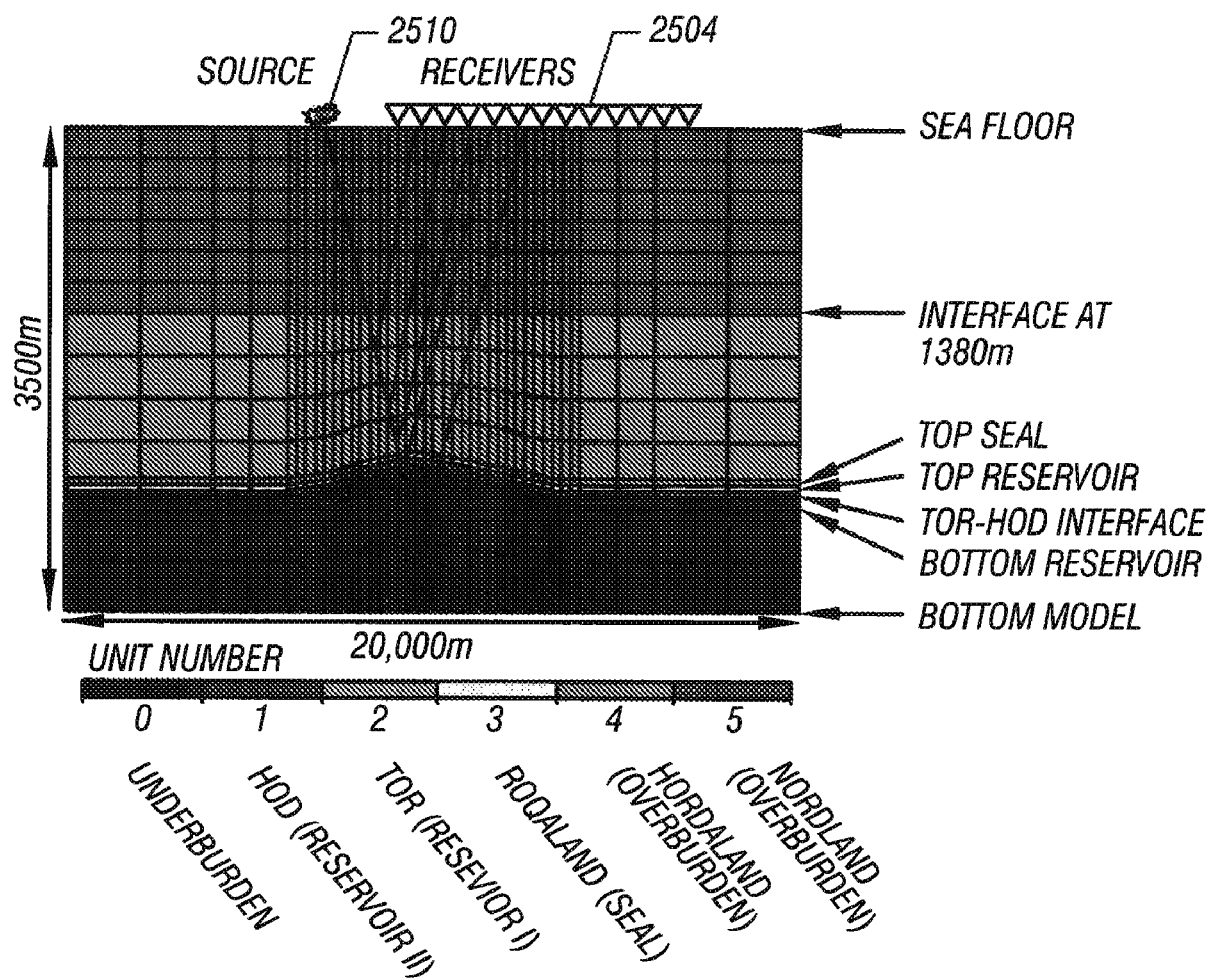
FIG. 23 depicts an exemplary velocity model for processing a base survey according to an embodiment of the invention.
Figure 24:
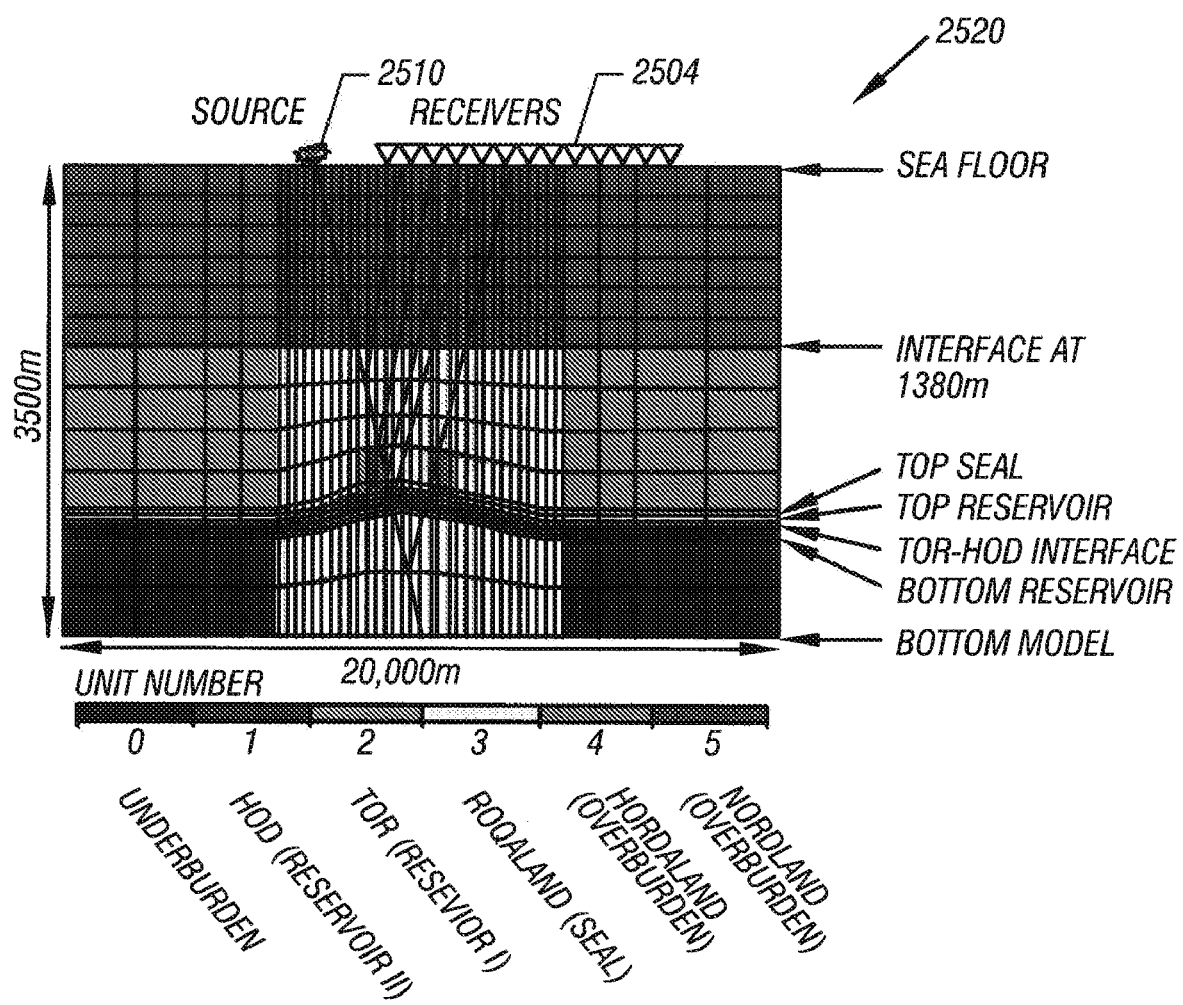
FIG. 24 depicts the velocity model of FIG. 23 with an inserted velocity perturbation predicted by reservoir and geomechanical modeling according to an embodiment of the invention.
Figure 25:
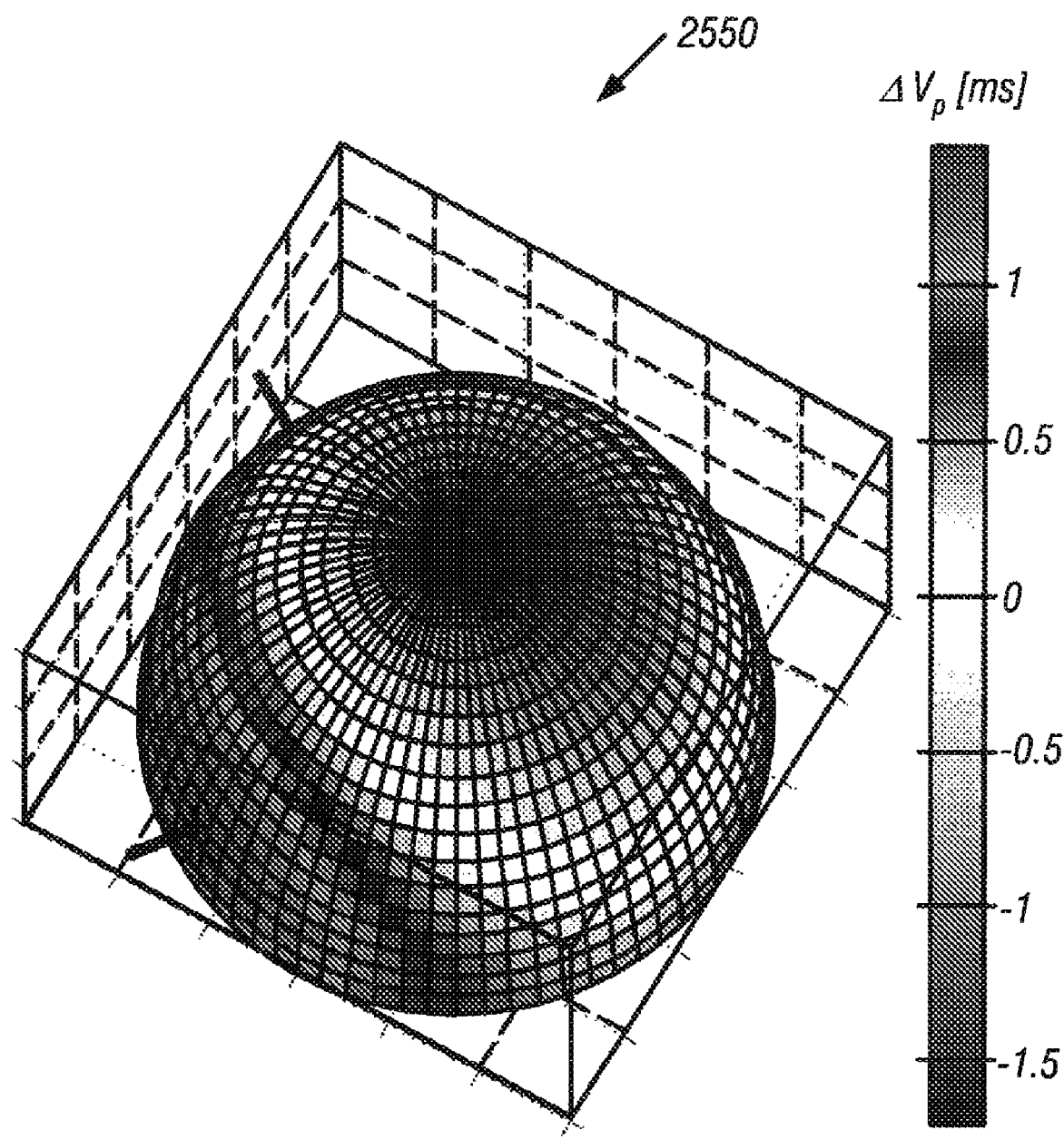
FIG. 25 is a three-dimensional view of the model of FIG. 24 illustrating the introduced velocity perturbation according to an embodiment of the invention.

As a more specific example, FIG. 23 depicts an exemplary velocity model 2500 for processing the base survey according to an embodiment of the invention. Thus, the velocity model 2500 is formed to model the velocity for the various paths along which seismic waves propagate in response to seismic energy that is produced by a source 2510. FIG. 24 depicts a corresponding velocity model 2520 with an inserted velocity perturbation that is predicted by coupled reservoir and geomechanical modeling. Referring also to FIG. 25, which depicts a three-dimensional view 2550 of the model 2520, the velocity perturbation may be anisotropic. In other words, the velocity perturbation may be a function of propagation direction (for an anisotropic model) as well as a function of location (for an inhomogeneous model).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
accessing seismic data associated with seismic measurements taken from a reservoir and a surrounding rock mass at a given time; and
based on a velocity model developed from a predicted change in the reservoir and surrounding rock mass occurring from a prior time to the given time, processing the seismic data to generate a survey of the reservoir and surrounding rock mass.

2. The method of claim 1, wherein the processing comprises: using the velocity model to perform migration.

3. The method of claim 1, further comprising: developing the velocity model based on predicted velocity changes in the reservoir and surrounding rock mass from a velocity model developed from seismic measurements taken at the prior time.

4. The method of claim 1, further comprising:
ascertaining a perturbation of an anisotropic physical property in the reservoir and surrounding rock mass over time; and
determining velocity changes resulting from the perturbation in the anisotropic physical property.

5. The method of claim 4, wherein ascertaining the perturbation of the anisotropic physical property includes ascertaining a perturbation in at least one of a multi-dimensional stress state, changes in fluid content, changes in fluid saturation, and dislocation of reflectors.

6. The method of claim 1, further comprising:
modeling the reservoir and rock mass surrounding the reservoir from acquired geophysical data; and
simulating the reservoir and rock mass over time from the reservoir and rock mass model.

7. The method of claim 6, wherein modeling the reservoir and the rock mass from acquired geophysical data includes building a coupled reservoir and geomechanical model.

8. The method of claim 6, wherein modeling the reservoir includes modeling at least one of a plurality of inclusions such as a plurality of pores and a plurality of fractures.

9. The method of claim 6, wherein modeling the reservoir and the rock mass from acquired geophysical data includes modeling the reservoir from a least one of seismic data, logging measurements, and core-measurement.

10. The method of claim 6, wherein modeling the reservoir and rock mass from acquired geophysical data includes modeling the reservoir from at least one of reservoir size, a count of the wells penetrating the reservoir, the locations of the wells penetrating the reservoir, the physical properties of the reservoir, and the initial stress state data.

11. The method of claim 6, wherein modeling the reservoir and the rock mass from acquired geophysical data includes specifying the mechanical properties of the reservoir and the rock mass.

12. The method of claim 6, wherein simulating the reservoir and rock mass over time includes simulating the reservoir during production over time.

13. An article comprising a computer accessible storage medium to store instructions that when execute cause a processor-based system to:
receive seismic data associated with seismic measurements taken from a reservoir and a surrounding rock mass at a given time;

based on a velocity model developed from a predicted change in the reservoir and surrounding rock mass occurring from a time prior to the given time to the given time, process the seismic data to generate a survey of the reservoir and the surrounding rock mass.

14. The article of claim 13, the storage medium storing instructions that when executed cause the processor-based system to: use the updated velocity model to perform migration.

15. The article of claim 13, wherein the survey comprises a monitor survey and the obtained velocity model is derived from a prior base survey.

16. The article of claim 13, the storage medium storing instructions that when executed cause the processor-based system to:
    ascertain a perturbation of an anisotropic physical property in the reservoir and surrounding rock mass over time; and
    determine velocity changes resulting from the perturbation in the anisotropic physical property.

17. The article of claim 16, wherein the perturbation comprises a perturbation in at least one of a multi-dimensional stress state, changes in fluid content, changes in fluid saturation, and dislocation of reflectors.

18. The article of claim 13, the storage medium storing instructions that when executed cause the processor-based system to:
    model the reservoir and a rock mass surrounding the reservoir from acquired geophysical data; and
    simulate the reservoir and rock mass over time from the reservoir and rock mass model.

19. A system comprising:
    an interface to:
        receive seismic data associated with seismic measurements taken from a reservoir and a surrounding rock mass at a given time; and
    a processor to:
        based on a velocity model developed from a predicted change in the reservoir and surrounding rock mass occurring from a time prior to the given time to the given time, process the seismic data to generate a survey of the reservoir and the surrounding rock mass.

20. The system of claim 19, wherein the processor uses the updated velocity model to perform migration.

21. The system of claim 19, wherein the processor updates a velocity model derived from seismic measurements taken at said time prior to the given time to generate the velocity model developed from the predicted change.

22. The system of claim 19, wherein the processor uses at least one model of the reservoir and the surrounding rock mass to predict the change.

23. The system of claim 19, wherein the processor uses a simulation of production from the reservoir to predict the change.

24. The system of claim 19, wherein the processor comprises at least one microprocessor-based system.

* * * * *